(12) United States Patent
Thanga et al.

(10) Patent No.: US 9,047,136 B2
(45) Date of Patent: Jun. 2, 2015

(54) METHOD AND SYSTEM FOR MIGRATING THE STATE OF A VIRTUAL CLUSTER

(75) Inventors: Zoram Thanga, Bangalore (IN); Ellard T. Roush, Burlingame, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 686 days.

(21) Appl. No.: 12/813,744

(22) Filed: Jun. 11, 2010

(65) Prior Publication Data

US 2011/0307886 A1  Dec. 15, 2011

(51) Int. Cl.
| G06F 3/00 | (2006.01) |
| G06F 9/44 | (2006.01) |
| G06F 9/46 | (2006.01) |
| G06F 13/00 | (2006.01) |
| G06F 9/50 | (2006.01) |

(52) U.S. Cl.
CPC .................................... *G06F 9/5077* (2013.01)

(58) Field of Classification Search
None
See application file for complete search history.

(56) References Cited

U.S. PATENT DOCUMENTS

| 8,090,744 | B1 * | 1/2012 | Baird ............................. 707/791 |
| 8,359,593 | B2 * | 1/2013 | Golosovker et al. .............. 718/1 |
| 2005/0262411 | A1 * | 11/2005 | Vertes et al. ................... 714/741 |
| 2006/0200821 | A1 * | 9/2006 | Cherkasova et al. ............. 718/1 |
| 2011/0022711 | A1 * | 1/2011 | Cohn ............................ 709/225 |
| 2011/0161730 | A1 * | 6/2011 | Van Der Merwe et al. ..... 714/15 |
| 2011/0246985 | A1 * | 10/2011 | Zhou et al. ........................ 718/1 |

* cited by examiner

*Primary Examiner* — Craig Dorais
(74) *Attorney, Agent, or Firm* — Park, Vaughan, Fleming & Dowler LLP

(57) ABSTRACT

The administrative work needed to configure a virtual cluster is a major obstacle that limits its adoption by customers. Moreover, an organization can spend much time and effort testing a cluster configuration and would like to deploy this cluster configuration at many sites. To address these problems, the disclosed embodiments provide a mechanism that facilitates migrating a virtual cluster from a first computer system to a second computer system. During operation, the system captures the virtual cluster configuration state, including application configuration state and executables. The system then instantiates this captured state on a second computer system, thus re-creating the virtual cluster state of the first computer system on the second computer system.

20 Claims, 14 Drawing Sheets

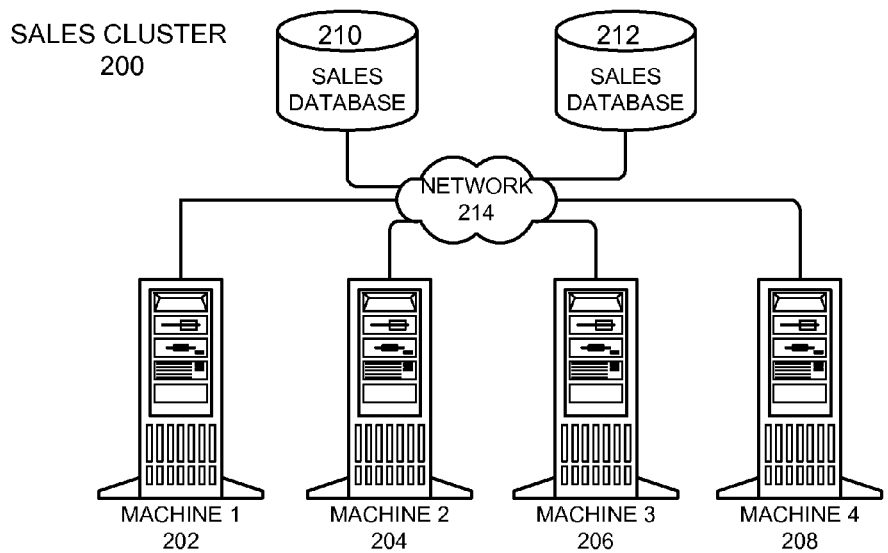
FIG. 2A
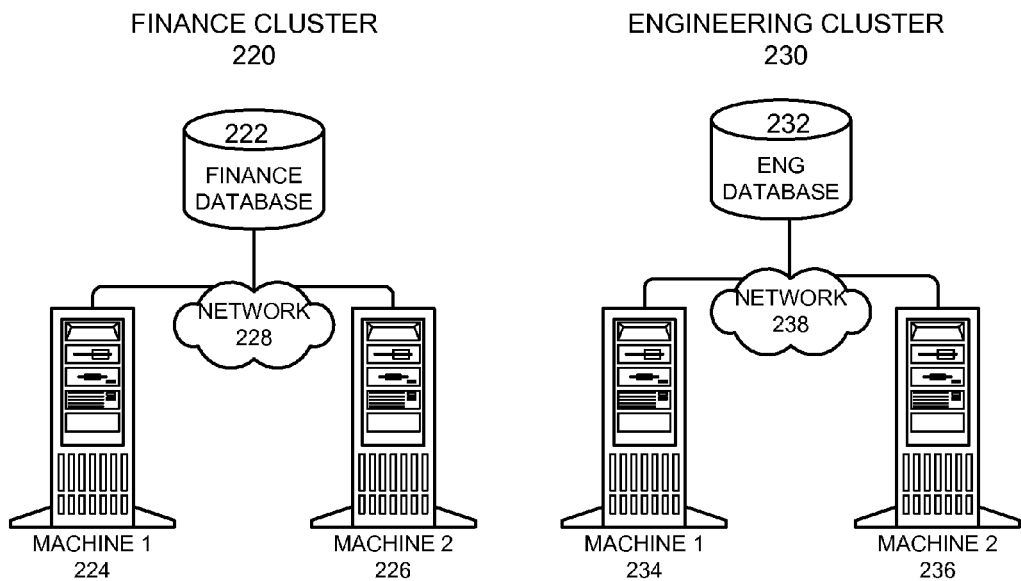
FIG. 2B
FIG. 2C

METHOD AND SYSTEM FOR MIGRATING THE STATE OF A VIRTUAL CLUSTER

BACKGROUND

1. Field

The present embodiments relate to clustered computer systems. More specifically, the present embodiments relate to techniques for migrating the state of a virtual cluster from a source cluster computer system to a target cluster computer system.

2. Related Art

Until recently, it was common for customers to dedicate a single physical cluster—a collection of interconnected computers—to one cluster application or a closely related set of cluster applications. The use of a dedicated cluster simplified resource management and isolated application faults to just the physical cluster. The relatively low cost of computer hardware made this approach affordable.

Although application processing demands have grown over time, in many cases these demands have grown at a much slower rate than the processing capacity of the computer systems. As a result, many physical clusters now sit mostly idle, with significant surplus capacity in all areas, including processor, storage, and networking.

The large amounts of idle processing capacity present a compelling opportunity to organizations to better utilize such systems. For example, in an effort to reclaim some of the unused capacity, some organizations have begun hosting multiple cluster applications on a single physical cluster. Concerns, however, about unknown and unintended interactions between cluster applications, especially with regards to security and resource management, have made these organizations wary of mixing applications (sometimes even on traditional physical clusters of computing nodes). Allaying these legitimate concerns and yet taking advantage of better system utilization is a challenge.

Virtual clusters address these concerns and provide safer ways to host multiple cluster applications in different virtual clusters on a single hardware configuration. To take advantage of idle processing capacity, one or more such virtual clusters can run on the same physical hardware cluster configuration. These virtual clusters are "islands of processing," which are isolated from each other. Hence, problems that may plague one virtual cluster do not affect any other virtual cluster, even though they are running on the same hardware. A virtual cluster "virtualizes" a physical cluster hosting a cluster application in the same way that physical memory in a computer system can be made "virtual" to give the illusion that all the physical memory is available to a single application and that the single application is the only application running on the computer.

Though the technology to achieve virtualization has added considerable flexibility—permitting multiple clusters to run on the same hardware configuration for better utilization—it comes at the cost of complexity. Today an operating system can not only provide multiple separate application environments as exemplified by operating system virtualization technology, it can also run on either a virtual machine or a physical machine. Thus, one machine may host multiple operating systems; a single collection of hardware machines may support multiple clusters. Virtualization technology has blurred the distinction between the clusters of hardware machines of yesterday and one or more clusters coexisting on the same hardware configuration of today.

Because an organization can spend significant time and effort testing a virtual cluster configuration, it is convenient if that same virtual cluster configuration can be easily migrated to other sites. Moreover, the administrative work required to configure a virtual cluster is a major obstacle that limits its adoption by customers. Configuring a virtual cluster configuration entails a large number of settings, including IP addresses, node names, storage devices, file systems, applications, and so on—getting all the details just right is a time-consuming and error-prone process.

SUMMARY

The described embodiments include a system for migrating the state of a virtual cluster from a first cluster system to a second cluster system. In these embodiments, one or more virtual clusters can "virtualize" the underlying hardware computer system so that each virtual cluster appears to be a separate cluster. A virtual cluster is a collection of one or more virtual nodes, where each virtual node appears to be an underlying machine. A virtual cluster can span all the machines of the underlying collection of hardware or any subset of those machines. During operation, the system captures the state of a selected virtual cluster on a first computer system. The system then instantiates the captured state of the virtual cluster on a second computer system. Next, this virtual cluster on the second computer system becomes operational and can begin serving client requests.

In some embodiments, capturing the state of the virtual cluster involves extracting the identified state from the virtual cluster. Note that the state of the virtual cluster includes the virtual cluster configuration state, the application configuration state, the virtual nodes configuration state, the data associated with the applications, or the binaries associated with the operating system, the virtual cluster, and the applications.

In some embodiments, instantiating the captured state of the virtual cluster on the second computer system involves receiving the captured state on each machine of the second computer system and importing it to each computer of the second computer system. During this process, the system creates the resources required by the virtual cluster on each machine; these resources may include one or more file systems, one or more devices, or one or more IP addresses. The system may also modify the configuration details of a virtual cluster for each machine of the second computer system depending on the needs of the second computer system; for example, the names and IP addresses of the machines of the second computer system are likely to be different from those machines of the first computer system. Then, the system activates the new virtual cluster on the second computer system. Finally, the system imports the data of all applications into the virtual cluster.

In some embodiments, a virtual node represents a machine. Note that a virtual node manages a portion of the resources of the machine; these resources may include at least processors, memory, IP addresses, or schedulers. Further, the virtual node contains applications that share the managed portion of the resources within the virtual node. Moreover, application defaults, user faults, or system faults are isolated to the virtual node and do not affect anything outside of that virtual node.

In some embodiments, the virtual node can be constructed using the operating system virtualization approach.

In some embodiments, the virtual cluster configuration state includes at least one of the following: one or more names of the virtual nodes of the virtual cluster, a map of virtual nodes to machines, one or more file systems, one or more storage devices, one or more network resources, one or more operating system resources, and a set of operating system privileges.

In some embodiments, the configuration state of the applications includes: resources such as file systems or network IP addresses; resource types, such as highly available databases; and resource groups, that group resources into units of recovery such as highly available database systems or file systems.

In some embodiments, the virtual nodes configuration state includes at least one of a configuration of each virtual node, software package information, and any patches installed in the virtual node of each machine.

BRIEF DESCRIPTION OF THE FIGURES

FIG. 2A shows a four-machine cluster for a sales organization in accordance with some embodiments.

FIG. 2B shows a two-machine cluster dedicated to a finance organization in accordance with some embodiments.

FIG. 2C shows a two-machine cluster dedicated to an engineering organization in accordance with some embodiments.

In the figures, like reference numerals refer to the same figure elements. Moreover, multiple instances of the same type of part may be designated by a common prefix separated from an instance number by a dash.

DETAILED DESCRIPTION

The described embodiments include a system that migrates the state of a virtual cluster from one system to another. More specifically, the described embodiments capture the configuration and application state of a virtual cluster on one computer system, transfer the captured state to a second computer system, and instantiate the captured state on the second computer system.

Generally, a group of computers which are working together are referred to as a cluster of computers (also called a "cluster"), or a distributed system. In such a cluster the computers (or "nodes") are typically independent and interconnected, and cooperate to maintain shared state. Clusters are useful because, among other things, they allow the sharing of information and resources over a potentially wide area and serve numerous customers. Clusters can be scaled by incrementally adding nodes. They can be highly available—when one node fails, another node can take over the service and provide potentially uninterrupted service. They can provide the illusion of a single system. They rarely, if ever, crash all at once. A distributed system of computing nodes is, therefore, fundamentally different from a centralized system. It is also harder to build such a distributed system out of interconnected computers because of independent failures, and factors such as unreliable, insecure, and costly communication.

Such powerful, modular, and scalable clustered systems can be built using inexpensive computing nodes coupled with high-speed interconnection networks. They can take the form of loosely coupled systems, built out of workstations or massively parallel systems, or perhaps as a collection of small symmetric multiprocessors (SMP) tightly-interconnected through a low-latency high-bandwidth network. Such clusters are attractive because traditional bus-based SMPs are limited in the number of processors, memory, and I/O bandwidth they can support.

Figure 1:
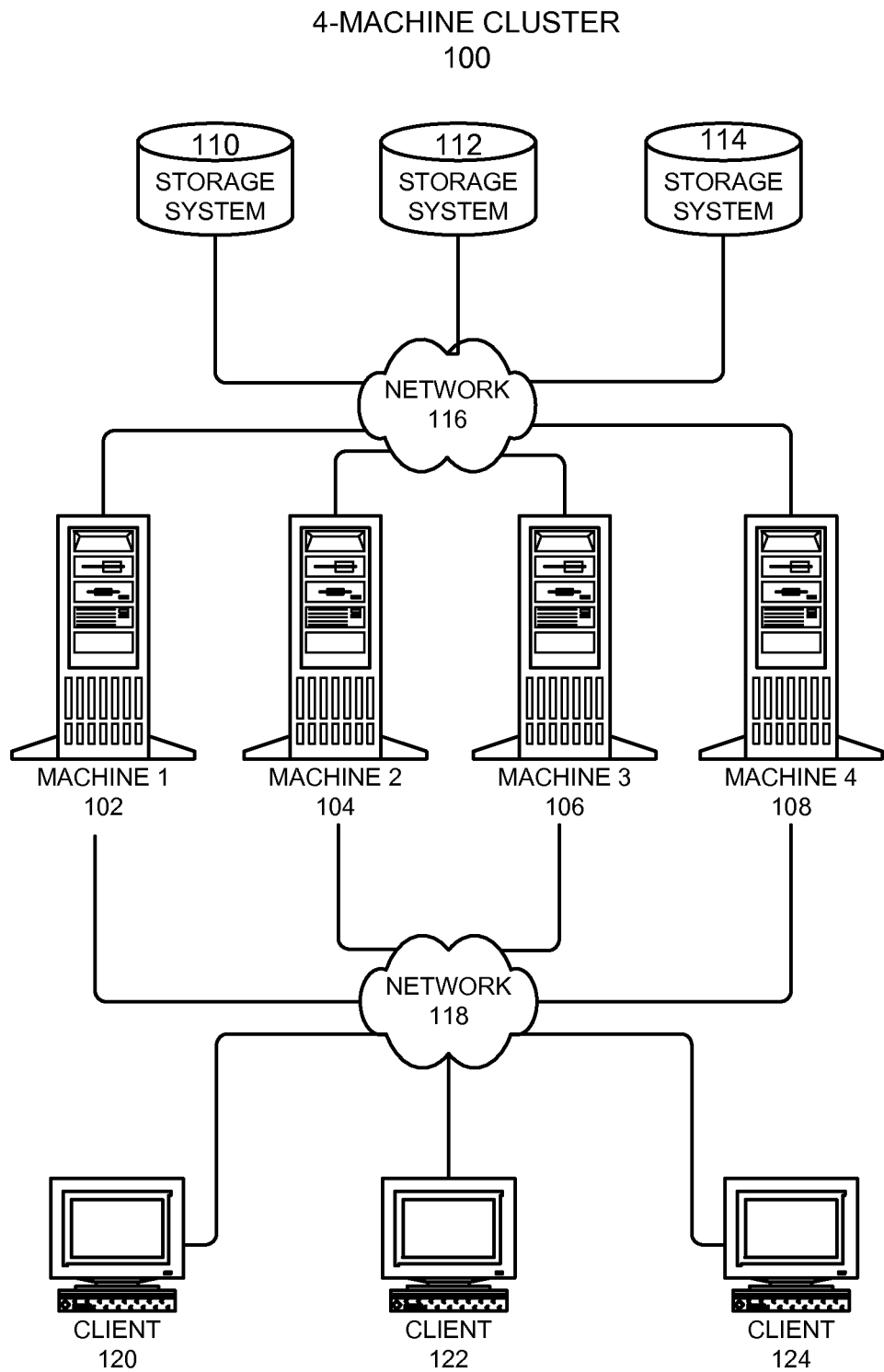
FIG. 1 shows a four-machine hardware configuration for clustering in accordance with some embodiments.

FIG. 1 shows a 4-machine cluster 100 organized in a four-machine computer hardware configuration (machine 1 102, machine 2 104, machine 3 106, and machine 4 108) in accordance with some embodiments. The figure shows four independent computing machines that communicate with each other over a network 116 (such inter-node communication may also occur over the public network), and share one or more external storage systems (storage system 110, storage system 112, and storage system 114), a common architecture often called "shared everything." In some embodiments, network 116 may be a public network shared with other systems such as computer systems and storage systems. In other embodiments, network 116 may be a private network. These four machines may communicate with each other over this private network without outside interference, and may also access the storage systems.

In some embodiments, other cluster architectures are possible, such as "shared nothing" in which a storage system is owned by each machine and is not shared with the other machines. Applications like databases or web services may run on any cluster machine. Note that the machines of a cluster can be as close or as far from each other as dictated by the requirements of the data services provided to clients. In some embodiments, they could be tightly coupled (for example, on the same rack or just in the same data center room); in other embodiments, they may be loosely coupled (campus clusters in which machines may be up to miles apart); in yet other embodiments, they may be geographically distributed in which the machines may be separated by hundreds to thousands of miles; or they may be aggregations of clusters (clusters are organized into a kind of hierarchy of clusters, often called "super clusters").

In one embodiment, numerous clients such as client 120, client 122 and client 124 may communicate with the four-machine cluster 100 over a network 118 to request services from the cluster. In another embodiment, network 118 may be a public network, shared with many systems and many clients. In other embodiments, network 118 may be a private network, for example, to restrict general access to specific client machines or perhaps to run a test benchmark that is only valid in a closed environment. In yet other embodiments, network 116 and network 118 may be the same or different network, whether public or private.

To provide data services that are highly available, a cluster provides nearly continuous access to data and applications by keeping the cluster running through failures that would normally bring down a single server system. Such a data service is typically implemented by a failover application, which is a single instance application that can run on just one machine at a time. The system will restart the failover application on another machine in response to a machine failure or administrative request. No single failure—hardware, software, or network—can cause a cluster to fail. Hardware-based fault-tolerant computer systems, on the other hand, certainly provide continuous access to data and applications, but at the higher cost of specialized hardware. Such systems cannot tolerate software failures.

To provide data services that scale, the cluster may add new machines to increase overall system capacity. A scalable application or data service comprises multiple application instances running on different machines. A web service is a good example of a scalable data service. Typically, a scalable data service is composed of several instances, each of which runs on different machines of the cluster. Together, these instances look and behave as a single service for remote clients of that service and implement the functionality of the service. Which service instance satisfies a client request depends on how the client requests are balanced across the cluster machines.

To achieve both scalability and high availability for data services, the architecture of the cluster system includes a combination of hardware and software redundancy. Such data services may require further support from the cluster itself. In particular, a cluster achieves high availability and scalability through a combination of the following hardware and software: redundant disk systems, redundant hot-swappable components, redundant communication, a high-availability framework, and a scalability framework.

Redundant disk systems. These disk systems provide storage and are generally mirrored to permit uninterrupted operation if a disk or its subsystem fails. Redundant connections to the disk systems ensure that data is not isolated if a server, controller, or cable fails. That is, the paths to the disk system are highly available.

Redundant hot-swappable components. These components, such as power supplies and cooling systems, improve availability by enabling systems to continue operation after a hardware failure. Hot-swappable components provide the ability to add or remove hardware components in a functioning system without bringing down the system.

Redundant communication. A redundant high-speed interconnect among cluster machines provides highly available access to resources from within the cluster. The machines in the cluster may also be connected to a public network, enabling clients on multiple networks to access the cluster.

High-availability framework. A cluster's high-availability framework can detect a machine failure quickly and switch the application or service to another machine that runs in an identical environment. At no time are all applications unavailable. Applications unaffected by a failed machine are fully available during recovery. Furthermore, applications on the failed machine become available as soon as they are recovered. Note that a recovered application does not have to wait for all other applications to complete their recovery.

Scalability framework. A cluster's scalability framework permits data services to scale as new machines are added to the cluster in the face of increased workload. It is desirable to maintain the same perceived response time to which customers are already accustomed. The framework balances client requests for service across multiple application instances of the service running on different cluster machines, using different load-balancing policies.

A system should ideally detect whether a machine in a cluster has actually failed, and should ideally do so within a reasonable period of time: too aggressively, and a machine will be kicked out of the cluster when it might only have been heavily loaded and just slow to respond, thus impacting availability; or too conservatively, and an actual failed machine will stay in the cluster too long and delay an application failover, thus severely impacting availability. The system should ideally reconfigure the cluster to include only operational and accessible machines. The system should also further decide which set of such machines constitute an operational cluster that can serve client requests; we call such a set of machines a "quorum," and it is usually a majority of the number of machines in the cluster. As part of reconfiguration, the system should also decide the fate of the minority number of machines. The minority of machines is not legally part of the cluster anymore, and should somehow be prevented from doing anything that could compromise either the integrity of the cluster or the correctness of the data. All of these activities and decisions should ideally be made quickly and seamlessly without affecting the availability or scalability of a data service in the face of hardware and software failures. It is this complex functionality of a cluster that makes it a daunting engineering challenge and one of the principal reasons why clustered applications are less common in the commercial marketplace today.

Another problem relates to how to determine which machines constitute a cluster, that is, determining cluster membership. Over the lifetime of such a cluster, a machine may fail for a variety of reasons and thus leave the cluster, which affects cluster membership (as well as high availability). Similarly, a machine that previously failed may return to service and rejoin the cluster, which also affects cluster membership. In some embodiments, a solution involves each machine in the cluster periodically sending "heartbeat" messages to all other machines in the cluster, indicating that that machine is "alive."

Until quite recently, it was common to dedicate a single cluster to one cluster application or a closely related set of cluster applications. Customers were willing to use one cluster per application for several reasons. Security isolation ensures that applications and users from different organizations could not see or affect others. Application fault isolation ensures that the failure of one application did not affect applications in other areas since different organizations insist that their own information remains private. Resource management provides controls on the utilization of resources by the applications of each organization, particularly since different organizations do not want their schedules impacted by problems of other organizations. Computer resources are not free.

Costs should ideally be allocated to the different organizations, and the different organizations want guarantees that they receive the resources for which they have paid.

The relatively low cost of computer hardware made this approach affordable. FIGS. 2A-2C show this typical approach to supporting three types of applications, with a different cluster supporting each type of application in accordance with some embodiments. For example, FIG. 2A shows a four-machine Sales Cluster 200 comprising machine 1 (202), machine 2 (204), machine 3 (206), and machine 4 (208) with two sales databases 210 and 212, which may communicate over a network. FIG. 2B shows a two-machine Finance Cluster 220 comprising machine 1 (224) and machine 2 (226) with a single finance database 222, which may communicate over a network 228. FIG. 2C shows a two-machine Engineering Cluster 230 comprising machine 1 (234), machine 2 (236), and a single engineering database 232, which communicate over a network 238. In one embodiment, network 214, network 228, and network 238 may be a public network. In another embodiment, network 214, network 228, and network 238 may be a private network. In another embodiment, these networks may be some combination of public or private. In other embodiments, these networks may include storage networks. One can view each cluster as a kind of "island" of high-availability and scalability. In such isolated systems, there is no danger of security and resource management interactions. Note that these examples are not meant to limit the scope of the present invention but serve to illustrate their possible uses.

Though the technology to achieve virtualization has added considerable flexibility—permitting multiple clusters to run on the same hardware configuration for better utilization—it may increase complexity. Today an operating system can now run on either a virtual machine or a physical machine. Thus, one machine may host multiple operating systems; a single collection of hardware machines may support multiple clusters. Such technology has blurred the distinction between the clusters of hardware machines of yesterday and one or more clusters coexisting on the same hardware configuration hosting multiple operating systems of today. In one embodiment, a "base cluster" is a collection of physical machines. In other embodiments, a "base cluster" is a collection of virtual machines, each of which may be running one or more operating system instances. To encompass both definitions, a "cluster" or "base cluster" shall refer to the set of machines hosting a cluster, where the machines can be either physical machines or virtual machines. Further, when we talk about a "machine" it will be either a physical machine or a virtual machine.

The trend toward more powerful computers has been accompanied by gains in other resources, such as increased storage capacity and network bandwidth. With greater power have come greatly improved price-to-performance ratios. While application processing demands have grown, in many cases these demands have grown at a much slower rate than the processing capacity of the computer system. As a result, many clusters now sit mostly idle, with significant surplus capacity in all areas, including processor, storage, and networking.

The large amounts of idle processing capacity present an opportunity to organizations to better utilize such systems. For example, in an effort to reclaim some of the unused capacity, some organizations have begun hosting multiple cluster applications on a single cluster. Concerns, however, about unknown and unintended interactions between cluster applications, especially with regard to security and resource management, make these organizations wary of mixing applications (sometimes even on a traditional base cluster of machines). Note that virtual clusters abstract away from the underlying machines and are dedicated to the same applications that were hosted on the base cluster.

Virtual Clusters

In the same way that physical memory on a computer was made "virtual" to give the illusion that all the physical memory was available to a single application and that the application was the only one running on the computer, it is possible to "virtualize" a base cluster hosting data service applications, that is, create a virtual cluster for those same applications. Two or more virtual clusters hosting different data service applications can run on the same hardware cluster configuration. It is important that all the hardware and all of its resources appear to be owned by each of the virtual clusters and that each virtual cluster is isolated from all other virtual clusters and is, therefore, unaffected by problems that may plague other virtual clusters.

Figure 3:
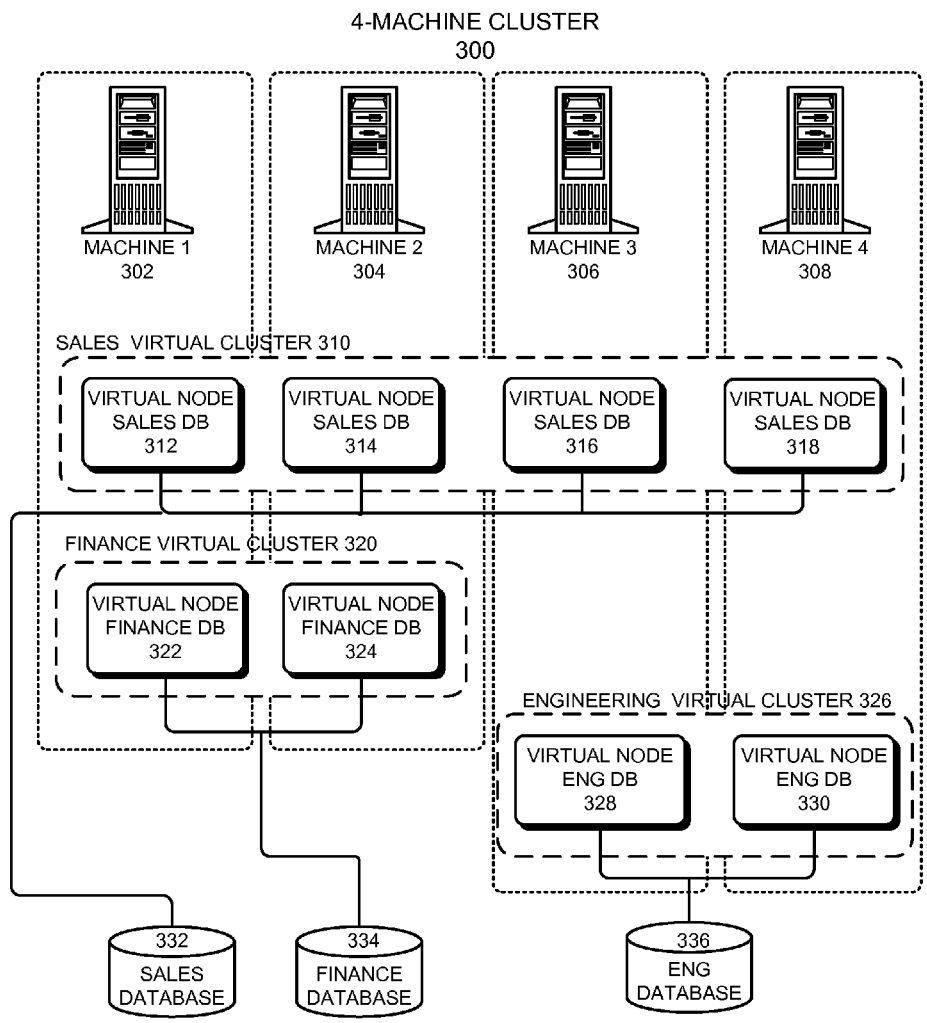
FIG. 3 shows a four-machine cluster hosting three virtual clusters in accordance with some embodiments.

The three base clusters shown in FIG. 2A-2C can be virtualized as shown in FIG. 3 in accordance with some embodiments. FIG. 3 shows three virtual cluster databases running on the same four-machine cluster 300. The databases of FIGS. 2A-2C from three different organizations can now be consolidated upon one four-machine cluster 300. In particular, the Sales Cluster 200 of FIG. 2A can now be represented as a virtual cluster, shown in FIG. 3 as the Sales Virtual Cluster 310. Each "machine" of the virtual cluster is now a "virtual node," the virtualization of the original corresponding machine. For example, FIG. 3 shows the virtual node sales database 312 on machine 1 (302), virtual node sales database 314 on machine 2 (304), virtual node sales database 316 on machine 3(306), and virtual node sales database 318 on machine 4 (308). Note that all four virtual nodes are connected to sales database 332. Similarly, the Finance Cluster 220 of FIG. 2B can be represented as its own virtual cluster, shown in FIG. 3 as the Finance Virtual Cluster 320. FIG. 3 further shows the two virtual nodes on their corresponding machines: virtual node finance database 322 on machine 1 (302) and virtual node finance database 324 on machine 2 (304). Note that the two virtual nodes are connected to finance database 334. Finally, the Engineering Cluster 230 of FIG. 2C can now be represented as its own virtual cluster, shown in FIG. 3 as the Engineering Virtual Cluster 326. FIG. 3 further shows the two virtual nodes on their corresponding machines: virtual node eng database 328 on machine 3 (306) and virtual node eng database 330 on machine 4 (308). Note that the two virtual nodes are connected to engineering database 336.

Note that the Sales Virtual Cluster 310 occupies all four machines of the cluster (machine 1 302, machine 2 304, machine 3 306, and machine 4 308), and the Engineering Virtual Cluster 326 occupies just two machines of the cluster, sharing machines machine 3 (306) and machine 4 (308) with the Sales Virtual Cluster 310. The Finance Virtual Cluster 320 shares machines machine 1 (302) and machine 2 (304) with the Sales Virtual Cluster 310, but no machines with the Engineering Virtual Cluster 326.

Figure 4:
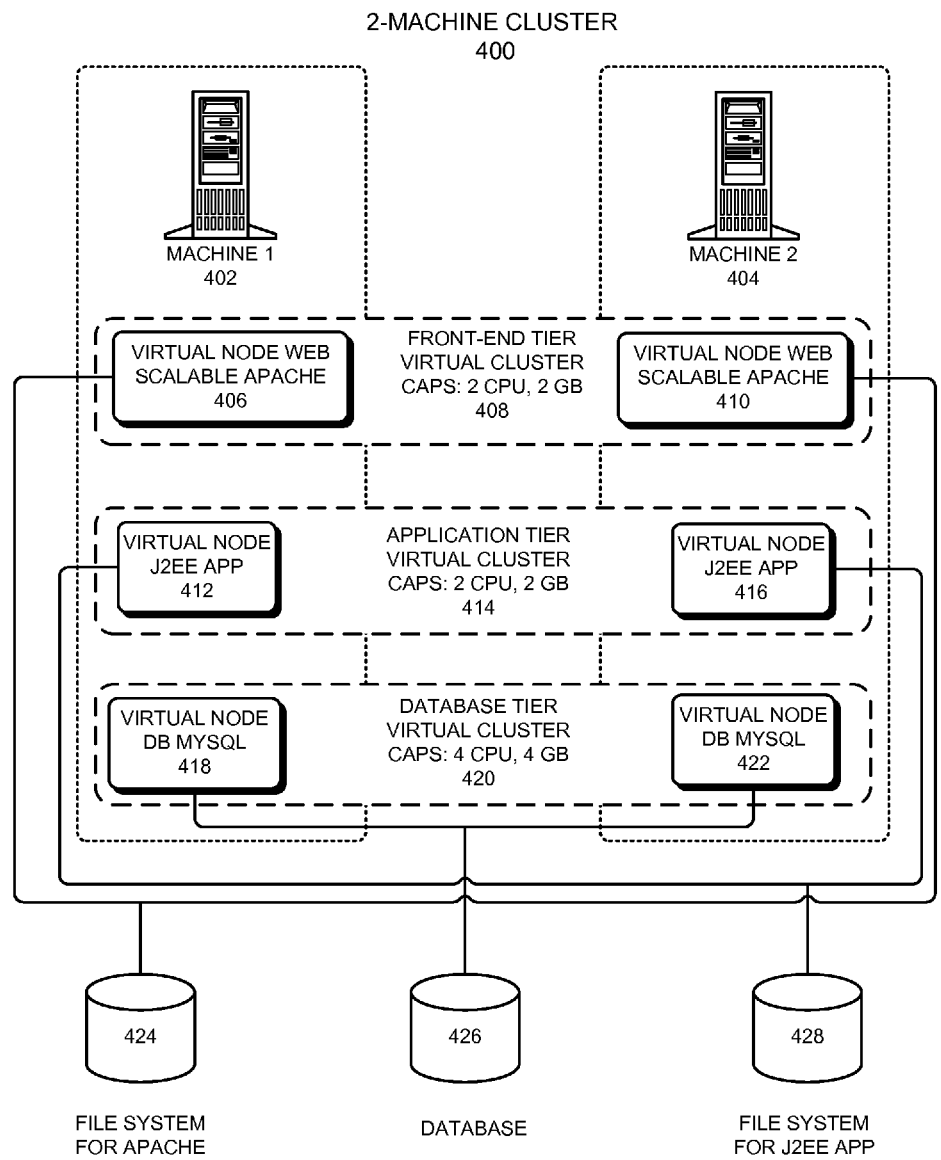
FIG. 4 shows an application consolidation example using the three-tiered web-application-database tiers where all tiers use separate virtual clusters in accordance with some embodiments.

FIG. 4 shows a multiple-tier consolidation example, in accordance with some embodiments, of the well-known three-tier datacenter model in a two-machine cluster 400: front-end tier, application tier, and database tier. Each virtual cluster has two virtual nodes, each representing an underlying machine (machine 1 402 and machine 2 404). Virtual clusters support the consolidation of applications from all three tiers. A scalable web server can implement the front-end tier virtual cluster 408 on virtual node web scalable apache 406 and virtual node web scalable apache 410; data is stored in a file system for apache 424. Java™ 2 Platform, Enterprise Edition (J2EE™) application implements the application tier virtual cluster 414 on virtual nodes virtual node J2EE app 412 and virtual node J2EE app 416; data is stored in a file system for J2EE app 428. MySQL™ database implements the database tier virtual cluster 420 on virtual nodes virtual node db MySQL™ 418 and virtual node database (db) MySQL™ 422; the data is stored in a database 426. All tiers use separate virtual clusters.

Virtual Nodes

In a virtual cluster, a virtual node is a container for applications. A virtual node offers the same security isolation, application fault isolation, and resource management features, in accordance with some embodiments, which customers demand of the one application-one cluster system. To provide security isolation for an application, an application or user within a virtual node can only see and modify data within that virtual node.

To provide resource management, the system administrator can control the allocation of resources at the granularity of a virtual node. The system administrator can assign specific resources, such as file systems, to a virtual node. The system administrator can effectively control the percentage of some resources, such as CPU power, allocated to a virtual node. Resource management provides the assurance that each organization, which is usually charged for computer services, gets what it pays for.

To provide application fault isolation, important cluster applications should preferably not recover from errors by rebooting the machines, but rather by rebooting the virtual node when the application resides within a virtual node. The reboot of one virtual node does not affect any other virtual node residing on the machine. Hence, the failure of an application in one virtual node does not impact applications in other virtual nodes. Virtual nodes, therefore, can safely consolidate applications from separate machines onto a single machine.

To implement such a virtual node as a container for applications, virtualization technologies can provide safe ways to host multiple applications in different virtual nodes on a single hardware configuration. A range of virtualization technologies that address network, storage, desktop, server, and operating system virtualization are offered by various companies. These virtualization choices facilitate hosting multiple applications on a single machine system, and include hardware partitions, virtual machines, operating system virtualization, and resource management. Each has its advantages and disadvantages, but only one satisfies the requirements of security, resource management, and application fault isolation for a virtual cluster: operating system virtualization.

The operating system virtualization approach creates an isolated environment for an application or set of applications under a single operating system image. This approach isolates software applications and services using flexible, software-defined boundaries and allows many private execution environments to be created within a single instance of the operating system, cleanly dividing system and application administration. The virtualized execution environment provides a unit of fault isolation. Rather than rebooting the machine, it is enough to "reboot" the virtualized execution environment. Since there is only one operating system instance to administer (such as with the use of patches and backups), administration costs are reduced. The performance overhead is generally minimal. This virtualized execution environment is a unit of granularity for resource management. Applications within this environment should ideally share the resources assigned to it. A system administrator can dedicate resources to this virtualized execution environment or grant some specific share of resources for its own use.

Oracle Solaris Zones

The Zones feature of the Oracle® Solaris 10 operating system from Oracle Corporation is an example of operating system virtualization in accordance with some embodiments. Oracle® Solaris Zones offers operating system virtualization that provides the foundation for implementing virtual clusters. Oracle Solaris Zones isolates software applications and services using flexible, software-defined boundaries and allows many private execution environments to be created within a single instance of the Oracle Solaris 10 operating system.

Figure 5:
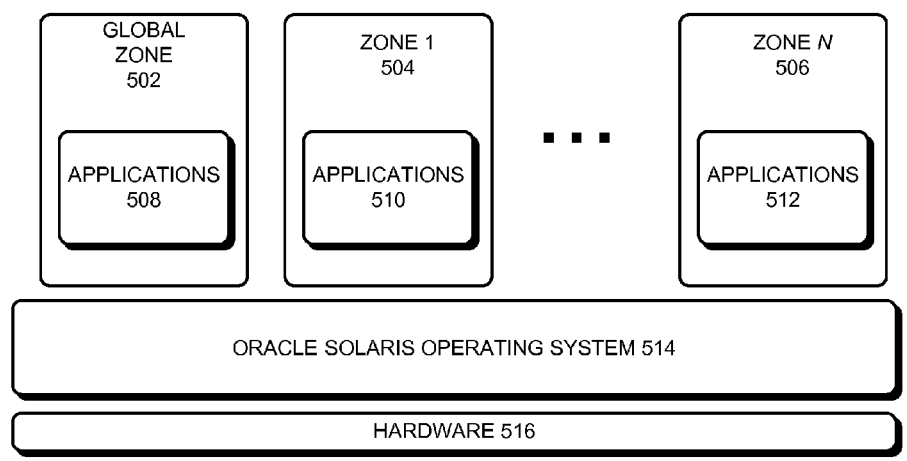
FIG. 5 shows Oracle® Solaris Zones in the context of the Oracle® Solaris operating system in accordance with some embodiments.

FIG. 5 shows Oracle Solaris Zones in the context of the Oracle Solaris operating system 514 on hardware 516 in accordance with some embodiments. The underlying Oracle Solaris operating system 514 has a single global zone (global zone 502) which is both the default zone for the system and the zone used for system-wide administrative control. The global zone 502 may also contain applications 508. The system administrator of the global zone 502 can create one or more non-global zones (such as zone 1 504 and zone N 506) and identifies all resources that will be made available to these non-global zones. An application or user within a non-global zone cannot see or affect things outside of the enclosing zone, thus providing strong security. FIG. 5 shows that zone 1 504 contains applications 510, the ellipsis shows the possibility of other non-global zones together with applications, and that zone N 506 contains applications 512.

The zone is a unit of granularity for resource management. Applications within a zone should ideally share the resources assigned to the zone. A system administrator can dedicate resources to a zone or grant some specific share of resources for use by a zone. For example, a system administrator can grant a Fair Share Scheduler share of 50 to zone A, 30 to zone B, and 20 to zone C; and the result would be that zone A gets 50% of CPU resources, while zone B gets 30% and zone C gets 20%.

The zone is a unit of fault isolation. For example, an attempt within a zone to execute a reboot results in a zone reboot instead of a machine reboot. This isolation helps prevent application actions or faults from affecting applications in other zones.

Implementing Virtual Clusters Using Oracle Solaris Zones

Combining the concept of the virtual cluster as a container for applications with the concept of operating system virtualization as embodied by Oracle Solaris Zones, we can create an Oracle Solaris Virtual Cluster, or Zone Cluster, in accordance with some embodiments. Since a zone provides the illusion to a single machine application that the zone is a machine dedicated for the use of the applications within that zone, the zone cluster provides the illusion to cluster applications that the zone cluster is a cluster dedicated for the use of cluster applications within that zone cluster. Similarly, when a user logs in to the zone cluster, the user sees the virtual cluster as a traditional cluster.

Figure 6:
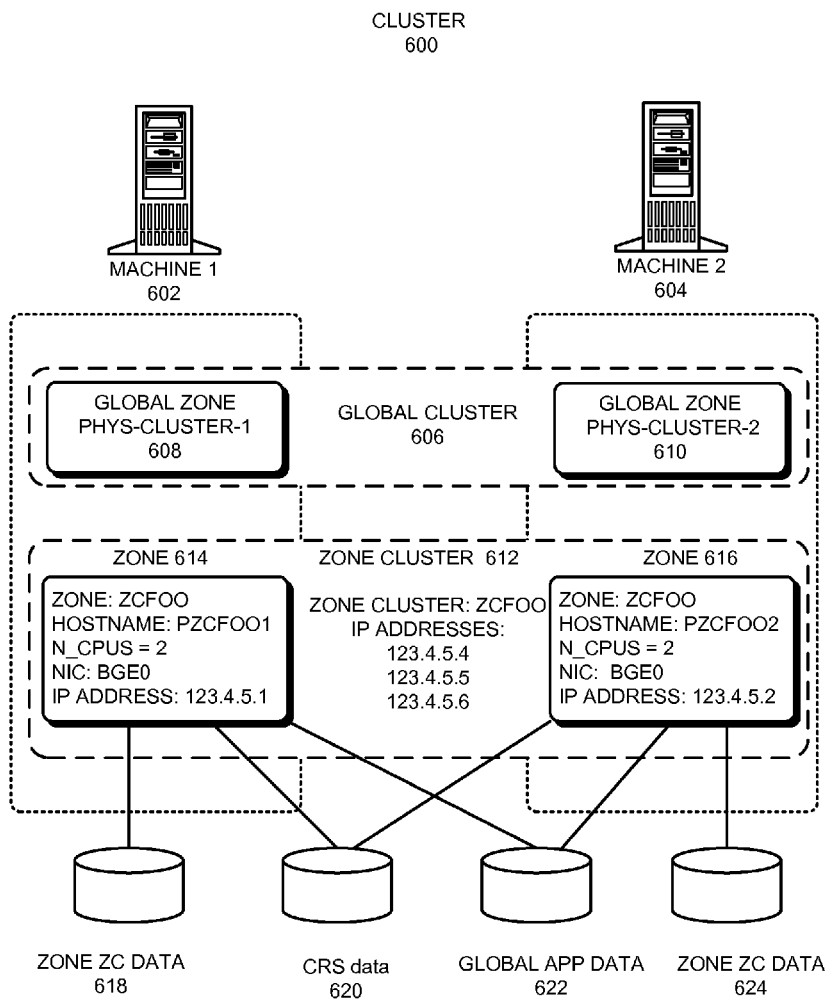
FIG. 6 shows the architecture of a virtual cluster in accordance with some embodiments.

FIG. 6 shows the architecture of a cluster, Cluster 600, implemented with Oracle Solaris Zones, in accordance with some embodiments. There is one global cluster and one virtual cluster in this particular configuration (of course, there can be more than one virtual cluster). The global cluster implements much of the complex functionality of the traditional cluster architecture, thereby considerably simplifying the architecture of the virtual cluster; such a functionality split allows the system administrator to focus on the cluster applications. The virtual cluster implements the other side of the functionality split that is specific to the virtual cluster.

Think of the virtual cluster as "lightweight" compared to the global cluster, which contains much of the heavy machinery. In the remainder of this section, we describe briefly the various components making up the architecture of a virtual cluster—the basis of the virtual cluster configuration that will be migrated to a target cluster—in terms of the virtual nodes, access control, security, applications, virtual cluster administration, virtual cluster membership, file systems, storage devices, volume manager devices, and networks.

Global cluster. FIG. 6 shows a global cluster 606 comprising the global zones on the two machines machine 1 (602) named "phys-cluster-1 608" and machine 2 (604) named "phys-cluster-2 610" making up cluster 600. Phys-cluster-1 608 is implemented in a global zone on machine 1 (602). Similarly, phys-cluster-2 610 is implemented in a global zone on machine 2 (604). The global cluster 606 contains all global zones in a collection of machines. The global cluster spans all machines making up the base cluster and looks to all appearances like a traditional cluster. Like a traditional cluster, the global cluster manages all the complexity of monitoring membership status of each global zone and reconfiguring the cluster whenever a global cluster node leaves the cluster due to failures or rejoins the cluster, in some embodiments. The global cluster decides which subset of global cluster nodes constitute an active and operational cluster; making this decision may involve employing a tie-breaking device, implemented in software or hardware (called a quorum device), whenever the global cluster finds itself in the well-known "split-brain scenario" through the notion of quorums and majority voting. Further, like a traditional cluster, the global cluster manages the configuration of zones on its resident node and the application configuration information.

Zone cluster. FIG. 6 shows zone cluster 612 "zcfoo" in accordance with some embodiments. A zone cluster is a collection of non-global zones, where each non-global zone represents a virtual node and is configured on a separate machine (for simplicity, we will use "zone" to mean "non-global" zone) in accordance with some embodiments. The number of virtual nodes in a zone cluster is limited to the number of machines in the cluster. A zone cluster can only become operational after the global zone on the hosting machine becomes operational. A zone of a zone cluster will not boot when the global zone is not booted in a special cluster mode. A zone of a zone cluster can be configured to automatically boot after the machine boots, or the administrator can manually control when the zone boots. A zone of a zone cluster can fail, or an administrator can manually halt or reboot a zone. All of these events result in the zone cluster automatically updating its membership. All zone cluster nodes should ideally be on machines belonging to the same global cluster. The zone cluster nodes can be a subset of machines for that same global cluster. While a zone cluster depends upon a global cluster, a global cluster does not depend upon any zone cluster. A zone cluster is a considerably simpler cluster than its traditional base cluster counterpart, as we alluded to earlier. Only the components needed to directly support cluster applications are present, including file systems, storage devices, networks, and zone cluster membership, all of which we will be discussing in the following paragraphs.

FIG. 6 shows a zone cluster 612 (zcfoo) deployed on a two-machine cluster (machine 1 602 and machine 2 604), in accordance with some embodiments. The zone cluster 612 (zcfoo) comprises two virtual nodes, each of which is implemented in its own zone on its respective machine. Note that the zone cluster itself as an entity may have resources allocated to it such as IP addresses (123.4.5.4, 123.4.5.5, and 123.4.5.6). These resources are shared amongst the zones of the zone cluster. In some embodiments, these three IP addresses could be one of many classes of virtual cluster IP addresses, such as failover IP addresses to support failover data service applications or shared IP (virtual) addresses to support scalable data service applications. For example, in zone cluster 612 shown in FIG. 6, two IP addresses are used by Oracle RAC (123.4.5.4, 123.4.5.5) as shared IP addresses, and one IP address (123.4.5.6) is used with a failover application. Zone 614 stores data on zone zc data 618 storage system, on CRS data 620 storage system, and on global app data 622 storage system. Zone 616 stores data on zone zc data 624 storage system, on CRS data 620 storage system, and on global app data 622 storage system.

Virtual node. The virtual node on machine 1 (602), whose host name is pzcfoo1, is implemented by zone 614 (zcfoo). The zone has been allocated 2 CPUs, one public network interface (bge0), and one public IP address 123.4.5.1. Note that this public IP address is local to the zone, whereas as we indicated earlier, the three IP addresses for zone cluster 612 (zcfoo) are allocated to the zone cluster as a whole. This configured zone looks just like a real machine complete with a public network interface and a public IP address as the means for the outside world to communicate with the zone. The virtual node on machine 2 (604), whose host name is pzcfoo2, is implemented by zone 616 (zcfoo). This zone has been allocated 2 CPUs, one public network interface (bge0), and a different public IP address 123.4.5.2. The virtual cluster configuration includes the names of the virtual nodes as well as the mapping of virtual node names to the names of the respective machines (that is, since each virtual node resides on a machine, the configuration includes a map of virtual node name to machine name).

Access control. The zone cluster provides a well-defined boundary for access control purposes. An application within a zone cluster can only see things within the zone cluster, and can only modify things within the zone cluster. The virtual cluster uses the zone resource management facilities. A system administrator should ideally explicitly configure a zone cluster to use any specific resource, such as a specific file system, or that resource will not be available. This provides the capability to isolate the resources of different cluster applications running in zone clusters. The system administrator can explicitly control the usage of CPUs and memory at the zone cluster level. Included in the virtual cluster configuration is information about resource usage.

Security. The zone cluster security design follows the security design for zones, in accordance with some embodiments. The zone is a security container. The operating system checks all requests to access resources, such as file systems, devices, and networks, to determine whether such access has been granted to that zone. When permission has not been granted, the operating system denies access. Software in the global zone is considered to be trusted, and has the responsibility to check the access permissions based upon the originating zone and deny any unauthorized access. Applications in a zone cluster cannot tamper with software in the kernel. The overall result is that the system restricts application access to just authorized items.

Applications. Applications within a virtual cluster should ideally remain within that virtual cluster. Note that an application within a virtual cluster can only move between the virtual nodes of the virtual cluster. All instances of an application should ideally reside within the same virtual cluster. This means that the virtual cluster is a cluster-wide container for applications that can be used to separate cluster applications. When an application running in a zone cluster enters an error state and calls for a node reboot, the zone cluster reboots the virtual node, which turns into a zone reboot. This means that the failure of an application within one zone cluster does not impact cluster applications running in other zone clusters.

More specifically, an application is managed—started, monitored, and stopped—by a major subsystem called the Resource Group Manager (RGM), part of which runs in the global zone and part of which runs in a specific zone, which is actually hosting the application. We will discuss this split in more detail later when we talk about how to capture the state of the virtual cluster. An application is regarded as a resource type, such as ha-dbms that makes a DBMS application highly available; in this case, the database application will fail over to another zone on another machine whenever the original zone fails. Applications are not the only resource type. Network resources are a resource type; in particular, there is a failover IP address resource type and a virtual (shared) IP address resource type. The system administrator creates and manages resources in containers called resource groups (RGs). The RGM stops and starts resource groups on selected zones in response to zone cluster membership changes.

For example, an end user may define separate databases for marketing, engineering, and finance, each of which is a resource of type ha-dbms. The system administrator places these resources in separate resource groups so that they can run on different nodes or zones and fail over independently. You create a second resource type, ha-calendar, to implement a highly available calendar server that requires a relational database. The system administrator places the resource for the finance calendar into the same resource group as the finance database resource to ensure that both resources run in the same zone and fail over together. The second resource type is said to depend on the first resource type. An ha-dbms resource type depends on a network resource type like a failover IP address. The virtual cluster configuration includes information about resource types, resources, and resource groups for each application hosted in the virtual cluster.

Virtual cluster administration. The entire virtual cluster can be administered by a single command from any machine. A virtual cluster is configured and managed using a single command. The command has options to configure, install, boot, and halt the virtual cluster or a subset of virtual nodes from any machine in the system. The single point of administration principle applies to the administration of the virtual cluster platform. The RGM subsystem manages applications and the resources used by applications, such as file systems and network resources. The administrator can administer applications and their resources by executing RGM commands from inside that virtual cluster or from the global cluster. The single point of administration principle applies to the administration of applications running in the virtual cluster.

Virtual cluster membership. Since a zone cluster is a set of zones, one can say that a non-global zone (or the virtual node it represents) is a "member" of a zone cluster, just as a global zone is a member of a global cluster. For example, in FIG. 6, we see that the zone cluster 612 (zcfoo) comprises of virtual nodes pzcfoo1 and pzcfoo2. Thus, we say that virtual node pzcfoo1 is a member of zone cluster 612 (zcfoo) just as pzcfoo2 is a member of zone cluster 612 (zcfoo). There are two kinds of membership with respect to a zone cluster.

First, there is a static membership, which defines all the virtual nodes of a zone cluster at the time of configuration of the zone cluster. Second, there is a dynamic membership, which defines a set of virtual nodes that are up and accessible at any time during the lifetime of the zone cluster. Most of the time this dynamic set is equal to the static set. The dynamic membership changes as virtual nodes "leave" the zone cluster because of failures or "join" the zone cluster as virtual nodes reboot and become available and accessible. For example, if virtual node pzcfoo2 fails or it is forced to reboot for some reason, then the zone cluster 612 (zcfoo) comprises only of virtual node pzcfoo1. Clients communicating with the virtual node pzcfoo2 may see its connections terminate. We say that a zone cluster undergoes "reconfiguration" when one or more virtual nodes join or leave the membership. We also say that the global cluster undergoes a similar kind of reconfiguration when one or more global cluster nodes join or leave the membership.

Each zone cluster has its own notion of membership, independent of other zone clusters, which is consistent with the notion that a zone cluster is an independent entity in its own right but happens to be implemented on a set of machines. Thus, if we refer back to FIG. 3, the Sales Virtual Cluster 310 and the Engineering Virtual Cluster 326 have very different ideas of membership. The Sales Virtual Cluster 310 comprises four virtual nodes, implemented on four machines (machine 1 302, machine 2 304, machine 3 306, and machine 4 308), while the Engineering Virtual Cluster 326 comprises only two virtual nodes that are implemented on two different machines (machine 3 306 and machine 4 308). The Sales Virtual Cluster 310 only cares about what happens to its four virtual nodes, whereas the Engineering Virtual Cluster 326 only cares about its two virtual nodes. When machine 1 (302) fails, the Sales Virtual Cluster 310 is affected, and its membership changes to exclude the failed virtual node, but—this is the important point—the failure of machine 1 302 did not affect the Engineering Virtual Cluster 326 notion of its membership. As far as the Engineering Virtual Cluster 326 is concerned, there have been no failures and nothing has changed.

The system maintains membership information for zone clusters. Each machine hosts a component, called the Zone Cluster Membership Monitor (ZCMM), which monitors the status of all zone clusters on that machine. The ZCMM knows which zones belong to which zone clusters.

A cluster application inside a zone cluster sees only the membership status of that zone cluster. A zone cluster can run on all machines of the base cluster or a subset of the machines of the base cluster. The global cluster and zone cluster membership information take the same form. Applications running in a zone cluster receive the same kind of information as when running in the global zone. This means that applications run identically in the zone cluster and global cluster with respect to membership.

File systems. Zone clusters support access to a variety of different types of file systems, including local, highly available, cluster, and NFS file systems, in accordance with some embodiments. The virtual cluster configuration includes information about specific file systems supported in the virtual cluster.

Storage devices. Zone clusters support direct access to storage devices including disks and RAID units. Zone clusters also support access to volume manager devices as if they were a disk. Zone clusters allow only one zone cluster direct access to any particular disk or RAID unit. Zone clusters support fencing of disks and RAID devices. The fencing feature ensures that a node that has left the cluster cannot continue to modify data on shared storage, and thus provides data integrity. The virtual cluster configuration includes information about storage devices supported in the virtual cluster.

Volume manager devices. Zone clusters also support access to volume manager devices. Zone clusters rely upon the basic zone support for volume manager devices. The volume manager administration should ideally be done from the global zone. Zone clusters support automatic volume manager reconfiguration after zone cluster membership changes from the global zone. The virtual cluster configuration includes information about volume manager devices supported in the virtual cluster.

Networks. Zone clusters support network communications over both the public and private networks. Public networks refer to communications outside of the cluster; private networks refer to communications between cluster nodes. The virtual cluster configuration includes information about public networks or private networks supported in the virtual cluster.

Migrating a Virtual Cluster

The administrative work required to configure a global cluster is cumbersome. After setting up one global cluster—with the IP addresses, node names, storage devices, file systems, applications, and so on—system administrators may shy away from setting up another one, let alone replicating the first one, because getting all the knobs and dials turned just right every time is time-consuming and error-prone. Note that the administrative work required to configure a virtual cluster can be substantial. The flexibility and utility of a virtual cluster, however, generally outweighs the complexity of initial administrative work.

Because an organization can spend much time and effort testing a virtual cluster configuration, it would be convenient if that same cluster configuration could be easily replicated at many customer sites. Global clusters and virtual clusters are often so complicated that figuring out what information is essential in any given cluster configuration is a daunting task indeed. One might think it would be a small matter of copying a few configuration files (assuming, of course, that they were organized in some fashion) to the second base cluster, and rebooting the second base cluster. However, it is not that simple because there are hundreds of parameters involved that are spread across multiple machines of the cluster.

If copying a few configuration files is not the answer to migrating a virtual cluster to another computer system, then one might consider migrating an Oracle Solaris zone. Since each virtual node in a virtual cluster is a zone and a zone is a container for applications with security isolation and application fault isolation, in theory that zone could be migrated to a different machine by using the Oracle Solaris zone migration tool. Zone migration, unfortunately, only works on single machine systems and cannot capture the configuration information of the virtual cluster. For example, zone migration knows nothing about the number of nodes in a virtual cluster. Zone migration knows nothing of cluster application management configuration information, such as the inter-dependencies among the applications, and system resources used by these applications. Thus, zone migration cannot migrate a virtual cluster. Hence, we could use a mechanism for reliably migrating the entire state of the virtual cluster at many sites.

Migrating a zone cluster captures this configuration information and recreates this configuration information on the target base cluster system. It makes it possible for a cloud in cloud computing system to dynamically provision a virtual cluster complete with application configuration information and data. It reduces the amount of administrative work and the amount of time needed to migrate a virtual cluster to a new cluster. It reduces the number of errors by automating as many manual steps as possible in the process and by using a single administrative point of operation. It reduces the amount of work of administrators by enabling the administrator to operate at the granularity of the virtual cluster. In other words, the administrator does not have to issue commands at the individual zone level and again at the cluster level.

Capturing Virtual Cluster State

The virtual cluster configuration entails a large number of settings. A system administrator usually enters this configuration information manually on a target cluster system (the target cluster system is the base cluster to which the virtual cluster will be migrated), a potentially time-consuming task so overwhelming that errors will inevitably arise. To better understand the complexity of configuring a virtual cluster, let us look at a more detailed view of a machine and the subsystems relevant to configuration.

Figure 7A:
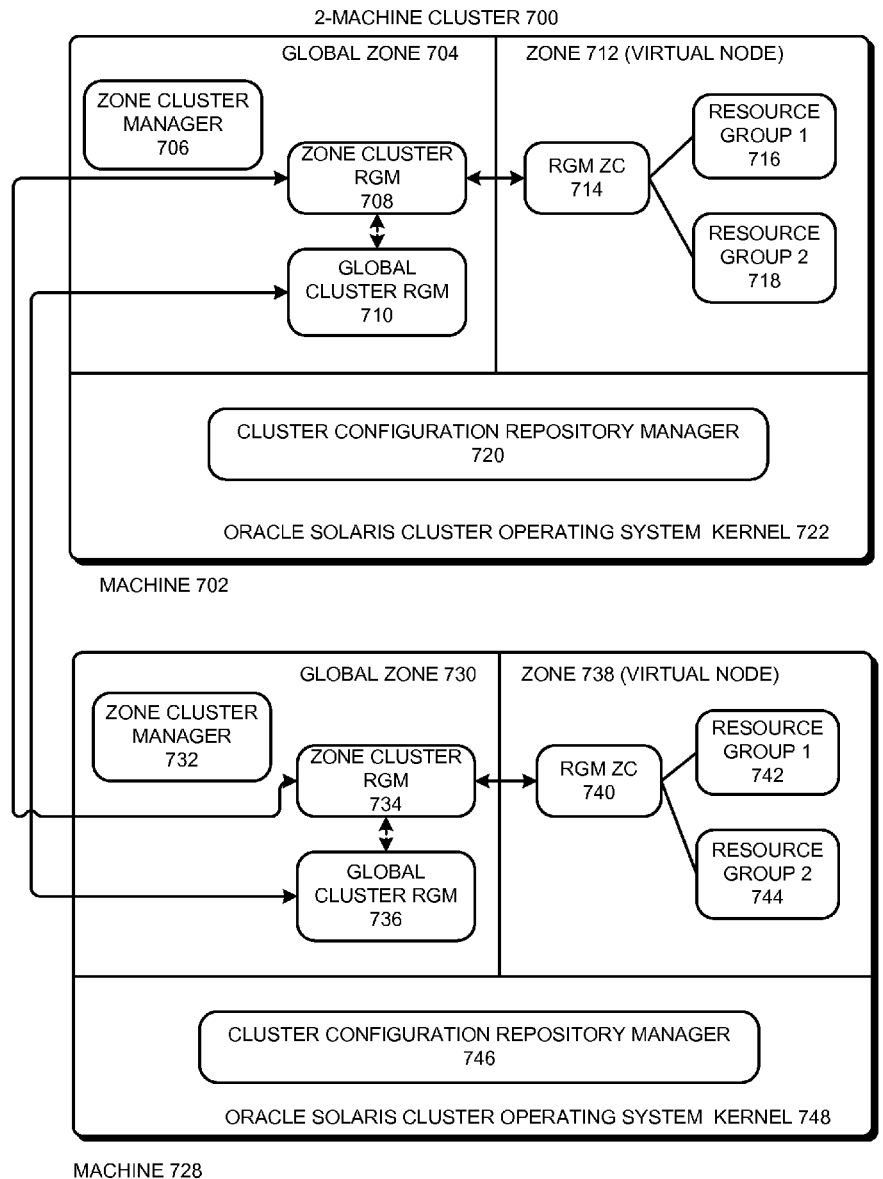
FIG. 7A shows a two-machine cluster with two global zones implementing a global cluster and two zones (non-global zones) implementing two virtual nodes of a virtual cluster (or zone cluster) in accordance with some embodiments

FIG. 7A shows a two-machine cluster 700 comprising two machines, machine 702 and machine 728, on which are implemented one global cluster and one virtual cluster (zone cluster). Machine 702 is home to a global zone 704, just as machine 728 is home to the global zone 730; together these two global zones implement the global cluster. Similarly, machine 702 is also home to zone 712 (virtual node), just as machine 728 is home to zone 738 (virtual node); together these two virtual nodes implement one virtual cluster. Of course, there may be (and often will be) other virtual clusters residing on this two-machine cluster 700, which are not shown in the figure to avoid cluttering the figure.

Inside the global zone 704, which implements a virtual node of the global cluster on this machine 702, are two major subsystems relevant to the configuration of both the virtual cluster and the collection of applications hosted on the virtual cluster: the Resource Group Manager (RGM) and the Zone Cluster Manager (ZCM). We will discuss each of these in turn. These subsystems are replicated in global zone 730 on machine 728.

The RGM in a traditional cluster functionally behaves as we described earlier: managing resource groups that are containers for applications where these resource groups include resources like applications, network resources and storage resources. In a system in which a global cluster is cleanly separated from one or more virtual clusters in accordance with some embodiments, as depicted in FIG. 7A, the functionality of the RGM is split into multiple components across a global zone 704 and a zone 712 and is replicated for each cluster. In particular, there is one global cluster RGM for each global zone on a machine; for example, FIG. 7A shows a global cluster RGM 710 residing in global zone 704 on machine 702, and a global cluster RGM 736 residing in a global zone 730 on machine 728. Note that for a global cluster there is typically one set of global cluster RGM components that spans the machines of the cluster. These primary RGM components collectively manage the resources (such as applications and file systems) in the global cluster. Both components—global cluster RGM 710 on machine 702 and global cluster RGM 736 on machine 728—communicate with each other to perform this collective management of resources in the global cluster. The RGM components for the global cluster do not manage or monitor resources belonging to any zone clusters.

For each virtual cluster node, or zone cluster node, there is a pair of RGM components which is specific to that zone cluster: on machine 702 the zone cluster RGM 708 component resides in the global zone 704, and RGM ZC 714 component resides in zone 712 (virtual node). If there were a second virtual cluster, another pair of these components would also be present and similarly would be split between the global zone and the zone for the virtual cluster. Note that the zone cluster RGM 708 component and the RGM ZC 714 component may communicate with each other, as is illustrated in FIG. 7A by a double-headed arrow line. The zone cluster RGM 708 on machine 702 and its counterpart, zone cluster RGM 734 on machine 728, may communicate (shown by the double-headed arrow line) with each other to exchange RGM-related information. The reason the primary RGM components for a Zone Cluster, such as Zone Cluster RGM 708 and Zone Cluster RGM 734, reside in the global zone (and not the zones) is that the RGM may need permissions that may not exist in a zone. For example, the RGM may need to mount file systems into a zone; this operation can only be performed from inside the global zone. A component inside an ordinary zone (typically called a "non-global zone") does not have the authority to make a file system accessible to ordinary zones.

Finally, the global cluster RGM 710 in global zone 704 and the zone cluster RGM 708 may optionally communicate with each other, as shown by the double-headed arrow dashed line; such communication will occur if there is an inter-cluster resource dependency or affinity. Any interaction is limited to information about the inter-cluster resource dependency or inter-cluster resource group affinity.

The RGM ZC 714 in zone 712 manages the resources (such as the resources in resource group 1 716 and the resources in resource group 2 718 in FIG. 7A) in its zone and is responsible for starting and stopping these resources (which starts and stops applications), as well as monitoring their status. An application administrator inside any node of a zone cluster can manage all of the resources across all nodes of that specific zone cluster and cannot affect any other cluster. An application administrator in the global cluster can administer resources in the global cluster or any specified zone cluster. Similarly, the RGM ZC 740 in zone 738 manages the resources (such as the resources in resource group 1 742 and the resources in resource group 2 744 in FIG. 7A) in its zone and is responsible for starting and stopping these resources (which starts and stops applications), as well as monitoring their status.

The zone cluster RGM 708 also communicates with a subsystem in the Oracle® Solaris Cluster operating system kernel 722 called the Cluster Configuration Repository manager (CCR) 720, a private, cluster-wide database that maintains all important information about the configuration state of the cluster on non-volatile storage. We shall expand on the important role of the CCR when we later discuss the state of the virtual cluster. Like its counterpart in global zone 704, the zone cluster RGM 734 in global zone 730 on machine 728 also communicates with a CCR 746 in the Oracle Solaris Cluster operating system kernel 748.

Within the global zone 704, the zone cluster manager 706 also communicates with the CCR manager 720 to create or destroy CCR data information maintained by the CCR manager 720, add new zone-related information, delete existing zone-related information, or update existing zone-related information. Similarly, within the other global zone 730, the zone cluster manager 732 also communicates with its CCR manager 746 to create or destroy CCR data information maintained by the CCR manager 746, add new zone-related information, delete existing zone-related information, or update existing zone-related information. We will see the role of the zone cluster manager later during our extended discussion of the CCR manager.

Figure 7B:
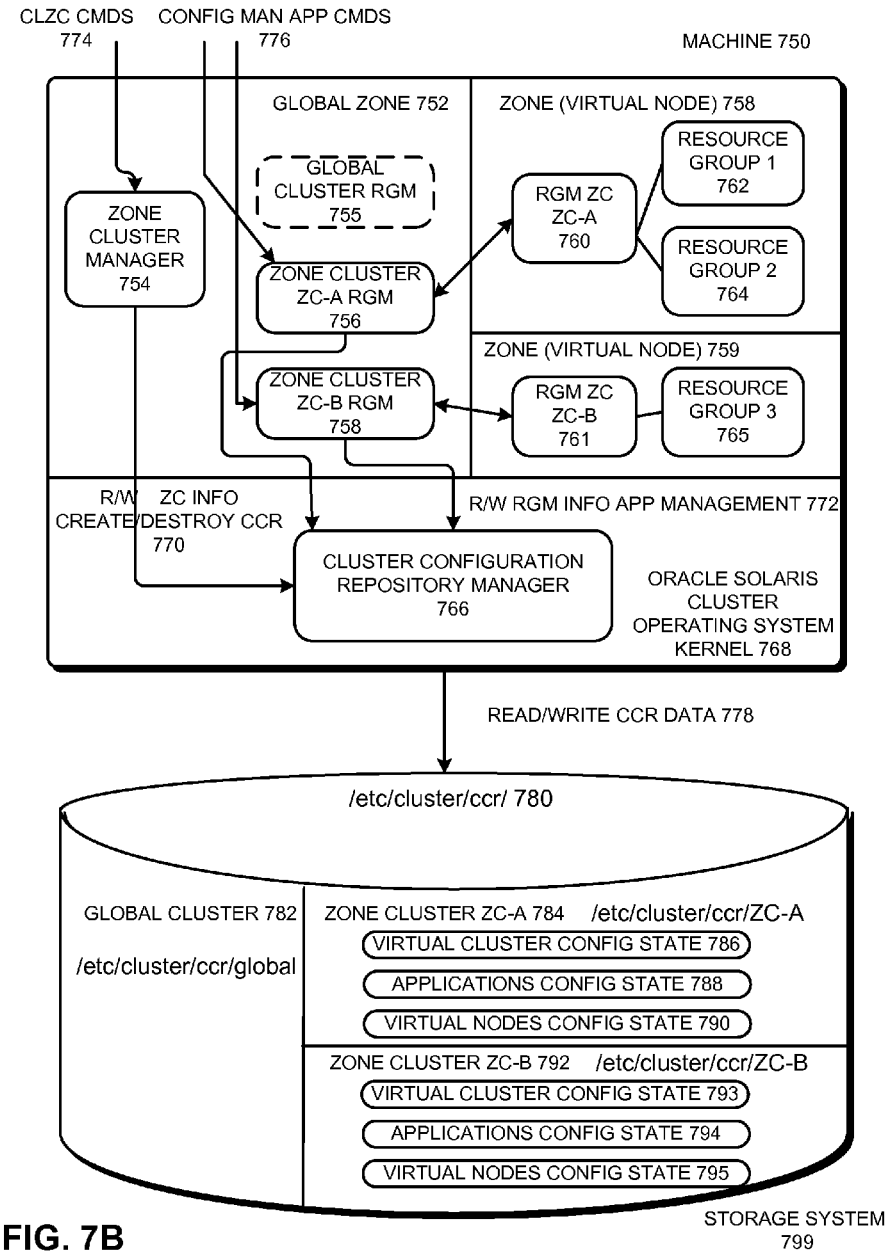
FIG. 7B shows a detailed view of a physical node with a global zone implementing a global cluster and a single zone implementing a virtual node in a virtual cluster in accordance with some embodiments, together with the configuration data for both a global cluster and virtual clusters stored in a storage system.

FIG. 7B shows a detailed view of just one machine 750 in accordance with some embodiments. Of course, this particular machine is just one of several such machines that are in the base cluster configuration, supporting one or more virtual clusters. This figure illustrates much of the same information from FIG. 7A but shows two zone clusters (or virtual clusters); more importantly, FIG. 7B shows the all-important storage system 799 we alluded to earlier, which stores the cluster configuration data. The reason for the two zone clusters is to make it clear that there is one global cluster and one or more zone clusters and to show the correspondence between a RGM ZC component in a zone with its counterpart RGM component in the global zone. For convenience, we name these virtual clusters ZC-A and ZC-B.

As before, machine 750 is divided into the same three major sections: the Oracle Solaris Cluster operating system kernel 768, a global zone 752 for the global cluster, and two zones implementing the virtual nodes of two virtual clusters. Further, FIG. 7B shows a storage system 799 associated with machine 750. In one embodiment, this storage system may be local to the machine. In other embodiments, this storage may be external to machine 750 and may or may not be shared with other machines.

Inside the global zone 752, which implements a virtual node of the global cluster on this machine 750, are the two major subsystems relevant to the configuration of both the virtual cluster and the collection of applications hosted on the virtual cluster: the Resource Group Manager and the Zone Cluster Manager.

As explained earlier in FIG. 7A, the functionality of the RGM is split into multiple components across a global zone and one or more zones and is replicated for each cluster. In particular, there is one global cluster RGM for each global zone on a machine; for example, FIG. 7B shows a global cluster RGM 755 residing in global zone 752 on machine 750. Note that global cluster RGM 755 is dashed to indicate that the component is active in the global zone 752 but that the following discussion is directed to virtual clusters only. We have already discussed that component's functionality in FIG. 7A.

Zone cluster ZC-A RGM 756 in the global zone 752 communicates with RGM ZC ZC-A 760 in the zone 758 (virtual node). In zone 758 the RGM ZC ZC-A 760 manages the resources (such as the resources of resource group 1 762 and the resources of resource group 2 764) in its zone and is responsible for starting and stopping these resources (which includes starts and stops of applications), as well as monitoring their status. Similarly, zone cluster ZC-B RGM 758 in the global zone 752 communicates with its counterpart RGM ZC ZC-B 761 in the zone 759 (virtual node). In zone 759 the RGM ZC ZC-B 761 manages the resources of a single resource group, such as resource group 3 765, in its zone and is responsible for starting and stopping these resources, as well as monitoring status.

An administrator can issue commands (configuration management application commands 776) to the zone cluster ZC-A RGM 756 or to the zone cluster ZC-B RGM 758 directly to create, or modify the configuration of applications. The administrator may also issue commands "clzc commands 774" to the zone cluster manager 754 in the global zone 752; "clzc" is short for "clzonecluster."

Besides communicating with the RGM ZC ZC-A 760 counterpart in a zone, the zone cluster ZC-A RGM 756 in the global zone also communicates with a subsystem in the Oracle Solaris Cluster operating system kernel 768 called the Cluster Configuration Repository manager (CCR) 766, a private, cluster-wide database that maintains all important information about the configuration state of the cluster on non-volatile storage. The zone cluster ZC-A RGM 756 communicates with the CCR manager 766 by issuing read/write RGM info 772 or application management information 772. Similarly, the zone cluster ZC-B RGM 758 also communicates with the CCR manager 766 by issuing similar read/write RGM information 772 or application management information 772.

Within the global zone 752, the zone cluster manager 754 also communicates with the CCR manager 766 to create or destroy CCR 770 the CCR data information maintained by the CCR manager 766, add new zone-related information, delete existing zone-related information, or update existing zone-related information. This information is important configuration information for the virtual clusters—this is the information that is migrated to a target cluster system.

Let us examine the CCR in detail. In the Oracle Solaris Cluster operating system kernel 768, the term "CCR" is typically used to refer both to the subsystem that manages the data and the data itself. To avoid confusion, we will be explicit and say "CCR manager 766" when referring to the subsystem and "CCR data" when referring to the data itself. The CCR subsystem is a private, cluster-wide, distributed database for storing information that pertains to the configuration and state of the cluster. To avoid corrupting configuration data, each node should ideally be aware of the current state of the cluster resources. The CCR manager 766 ensures that all nodes have a consistent view of the cluster. The CCR data is updated when error or recovery situations occur, or when the general status of the cluster changes. The CCR manager 766 stores its data on non-volatile storage, such as storage system 799, in accordance with some embodiments, by reading and writing CCR data 778 directly from and to the storage subsystem. Note that this storage system can be any non-volatile storage device that survives failure, and as we mentioned before may be local or external, shared or not.

The data stored in the CCR typically contains information about at least the following: cluster and node names, cluster transport configuration, the names of volume manager disk sets, list of nodes that can master each disk group, operational parameter values for data services, paths to data service callback methods, device identification configuration, cluster status, and so on.

The CCR data may be organized under a single directory on storage system 799 (the data on such a storage system should survive system failures) that is typically local to the node: /etc/cluster/ccr 780. This directory includes all the data cited earlier, but may be refined to include not only zone cluster-specific data but global cluster-specific data, thus cleanly separating zone cluster-specific data from global cluster-specific data. Thus, the global cluster 782 data may be organized into a subdirectory global (for global zone) /etc/cluster/ccr/global; the zone cluster data for each specific zone cluster may be organized in a different subdirectory, where the name of the subdirectory may be the name of the virtual cluster. This clean separation will simplify the process of identifying all the important state information that should be captured in order to migrate the state of a virtual cluster to a second cluster system.

In accordance with some embodiments, the CCR data stored on behalf of each virtual cluster may be recorded in a separate subdirectory of /etc/cluster/ccr where the subdirectory may be named after the virtual cluster name. Thus, there is /etc/cluster/ccr/ZC-A 784 for the virtual cluster "ZC-A" and /etc/cluster/ccr/ZC-B 792 for virtual cluster "ZC-B." In the subdirectory /etc/cluster/ccr/ZC-A 784 for the zone cluster "ZC-A" 784 data may be organized further into at least three configuration states, each of which may be organized into independent subdirectories: virtual cluster configuration state 786, applications configuration state 788, and virtual nodes configuration state 790. Similarly, on behalf of the second zone cluster "ZC-B" 792, the CCR data stored under the ZC-B subdirectory of /etc/cluster/ccr 780 for the zone cluster 759 data may be similarly organized further into at least three configuration states, each of which may be organized into independent subdirectories: virtual cluster configuration state 793, applications configuration state 794, and virtual nodes configuration state 795. This organization of the CCR data into independent subdirectories for the global cluster and each of the zone clusters cleanly separates the configuration data; this separation simplifies the process of capturing the configuration state of the global cluster and each of the zone clusters.

Figure 8:
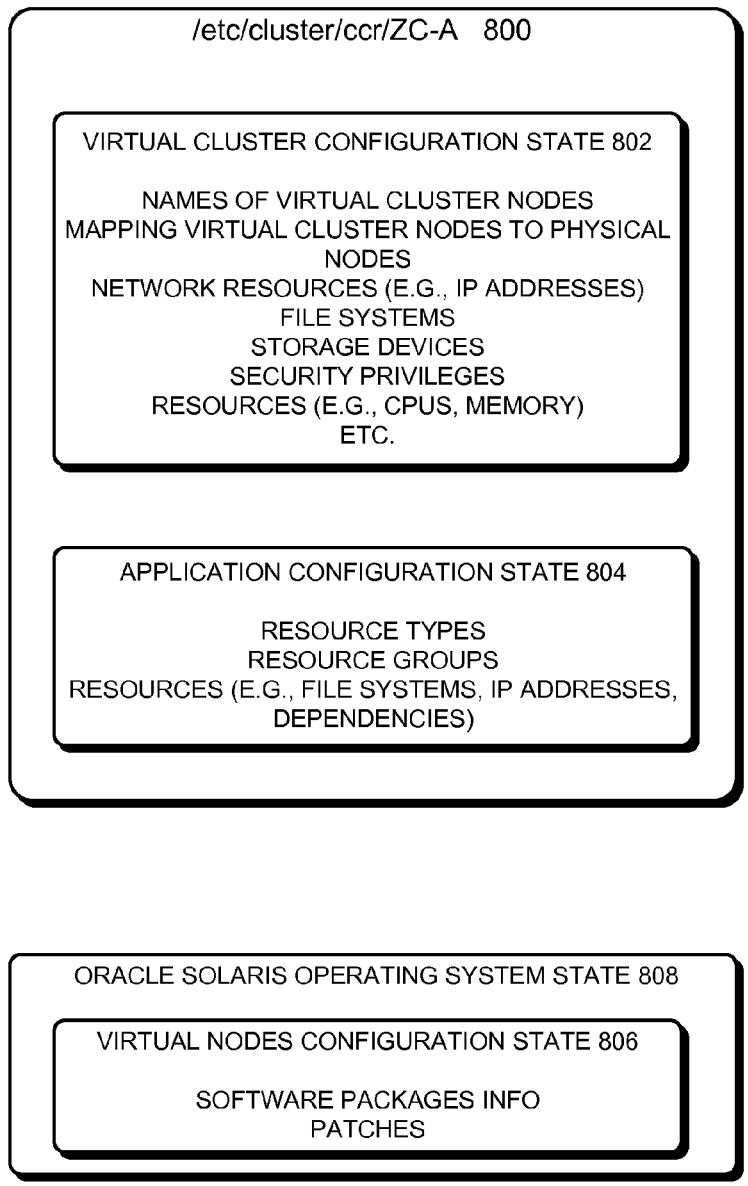
FIG. 8 shows generally the three configuration states (virtual cluster configuration state, application configuration state, and virtual nodes configuration state) that make up the configuration of a virtual cluster in accordance with some embodiments.

FIG. 8 expands on the three configuration states, in accordance with some embodiments. For each virtual cluster, the configuration state information may be stored under a subdirectory named after the virtual cluster's assigned name, as mentioned earlier. For example, FIG. 8 shows the subdirectory for a virtual cluster named "zcfoo: /etc/cluster/ccr/ZC-A/800.

The virtual cluster configuration state 802 may be a collection of information that fully specifies the zone cluster environment for the virtual cluster in question. Specifically, this information includes, but is not limited to, the items shown in the figure. The names of the virtual cluster nodes making up the virtual cluster are included in the configuration state. Note that in this embodiment the virtual cluster configuration state 802 may not include the name of the virtual cluster because that name happens to be embedded in the CCR path as explained previously, that is, ZC-A; the name could just as easily be incorporated into the state. Also included in the state is the mapping of the virtual cluster's virtual nodes to their machine counterparts. That is, for every virtual node in the virtual cluster, we should know which machine that virtual node resides on. Next, included in the state are the network resources such as IP addresses. The names and paths of cluster file systems and failover file systems are included in the state. Resources such as CPUs and memory are also part of the configuration state. Security privileges, such as Oracle Solaris operating system privileges, are included in the configuration state.

The application configuration state 804 may be a collection of the resource types, the resource groups, and the resources for all the applications contained in the virtual cluster, in accordance with some embodiments. This information fully describes all applications in the virtual cluster.

The third configuration state for the virtual cluster may be the virtual nodes configuration state 806 in accordance with some embodiments. This information describes the configuration of each virtual node, together with details of software packages information and patches installed in the virtual node on each machine in the virtual cluster. This information may not reside in the Cluster Configuration Repository. Instead, this information may be maintained by the Oracle Solaris operating system in its state 808 as FIG. 8 illustrates.

Figure 9:
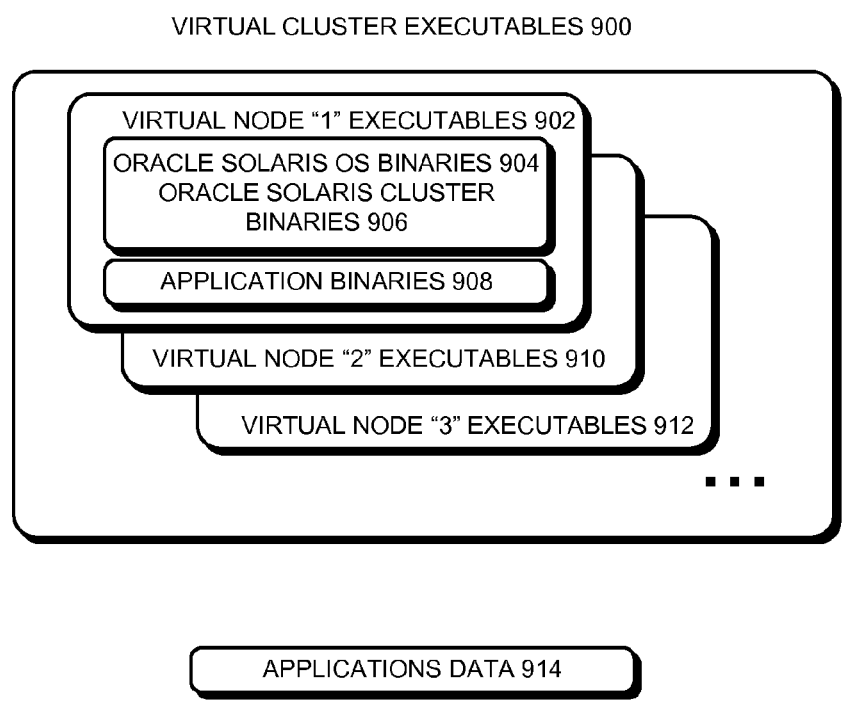
FIG. 9 shows the general collection of executables (binaries) that are identified, as part of the state of the virtual cluster, in accordance with some embodiments.

FIG. 9 shows the collection of virtual cluster executables 900 that may be identified, in accordance with some embodiments, as part of the state of the virtual cluster. Specifically, we identify for each virtual node of the virtual cluster both the Oracle Solaris operating system binaries 904 and the Oracle Solaris Cluster binaries 906, collectively called the virtual node "1" executables 902. (The Oracle Solaris Cluster binaries 906 may be cluster-specific binaries that the Oracle Solaris operating system may invoke to do cluster-specific tasks.) Further, we identify any application binaries 908 located on any virtual node in the virtual cluster; there may be some virtual nodes that are not hosting any application, and so there will be no application binaries. This collection of executables captures all the executables on virtual node "1,"

which for the purposes of illustration we give to the first virtual node in the virtual cluster. Similarly, there is a collection of executables for all remaining virtual nodes in the virtual cluster. FIG. 9 illustrates this through overlapping rectangles and assigning a name to each virtual node collection of executables: virtual node "2" executables 910 and virtual node "3" executables 912. Finally, there may be the data associated with each application—applications data 914.

Figure 10:
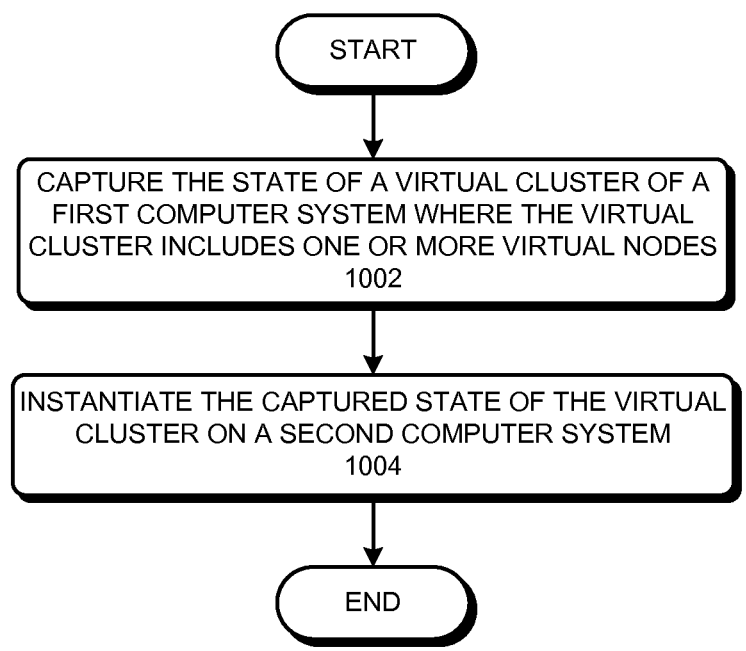
FIG. 10 presents a flowchart that illustrates a process for migrating the virtual state of a virtual cluster on a first computer system to a second computer system in accordance with some embodiments.

FIG. 10 presents a flowchart that illustrates a process for migrating the virtual state of a virtual cluster on a first computer system to a second computer system in accordance with some embodiments. Note that the specific arrangement of steps shown in the figure should not be construed as limiting the scope of the embodiments.

The process can begin by capturing the state of a virtual cluster of the first computer system (step 1002). The virtual cluster includes one or more virtual nodes. The captured state of a virtual cluster completely specifies the virtual cluster.

Next, the system instantiates this captured state of the virtual cluster on a second computer system (step 1004). After this step completes, the virtual cluster on the second computer system becomes operational and can serve client requests just as the original virtual cluster did on the first computer system.

Figure 11:
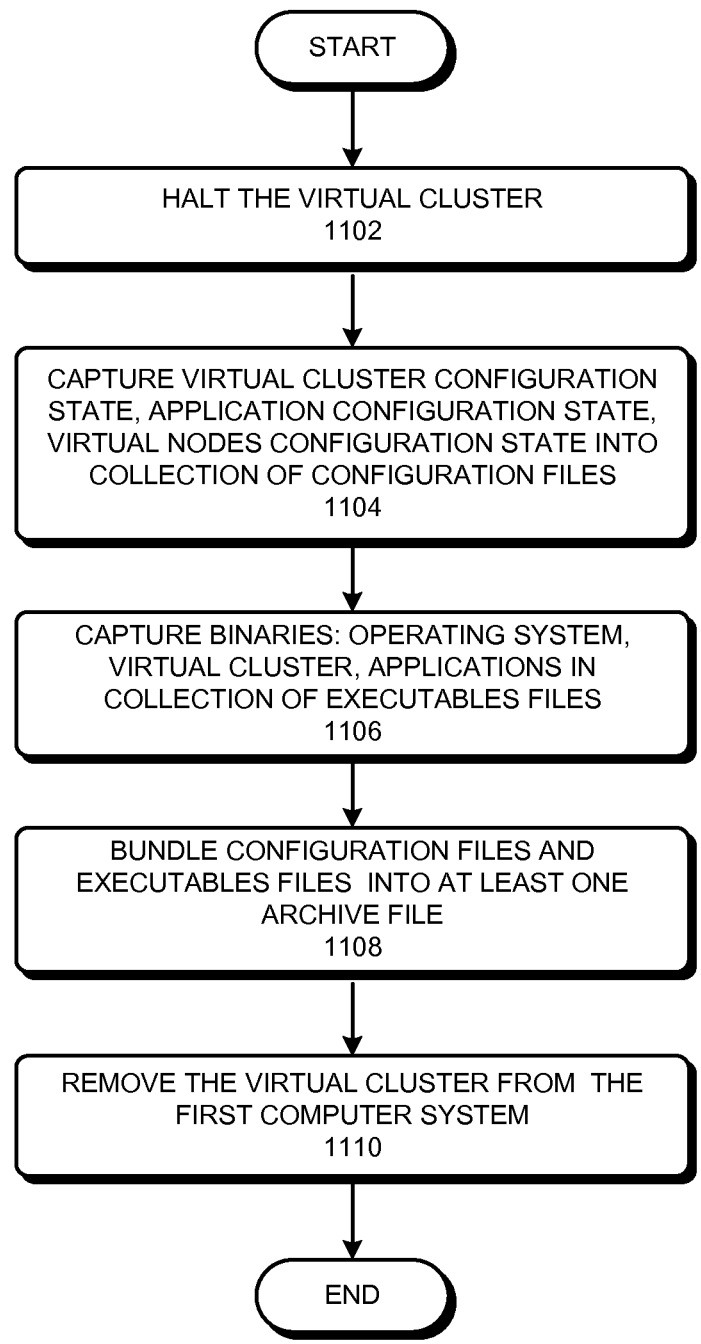
FIG. 11 presents a flowchart that illustrates a process for capturing the complete virtual state of a virtual cluster in accordance with some embodiments.

FIG. 11 presents a flowchart that illustrates a process for capturing the virtual state of a virtual cluster in accordance with some embodiments. Note that the specific arrangement of steps shown in the figure should not be construed as limiting the scope of the embodiments. For example, some virtual cluster state information may be collected before halting the virtual cluster. Typically, the system administrator executes the process illustrated in the flowchart. We assume that the system administrator is already logged in to the global zone on any machine.

The process can begin by halting the selected virtual cluster (step 1102), which the system administrator has already identified to be migrated to a second computer system (the target). Halting the virtual cluster includes stopping all activity in the cluster, such as shutting down all applications serving clients and denying further service to clients. In the Oracle Solaris Virtual Cluster, for example, in accordance with some embodiments, a system administrator would perform the clzonecluster halt command to halt the virtual cluster while logged in to the global zone on any machine.

Next, the administrator captures the virtual cluster configuration state, application configuration state, and virtual nodes configuration state into a collection of configuration files (step 1104). FIG. 8 shows the state that is captured. Note that the captured state may be stored in any convenient manner. This step and the next step of this process can be accomplished using the Oracle Solaris command clzonecluster detach; it is convenient to have a single command to accomplish a long sequence of error-prone operations.

Next, the system captures the binaries associated with the operating system, the virtual cluster, and all applications into a collection of executables files (step 1106).

Next, these configuration files and executables files are bundled into at least one archive file (step 1108). A software tool that may be used, in some embodiments, to create this archive file is the UNIX™ tar command.

Finally, the administrator may remove the virtual cluster from the first computer system (step 1110), in one embodiment. It is not strictly necessary to remove the virtual cluster in other embodiments.

Instantiating a Virtual Cluster

Figure 12:
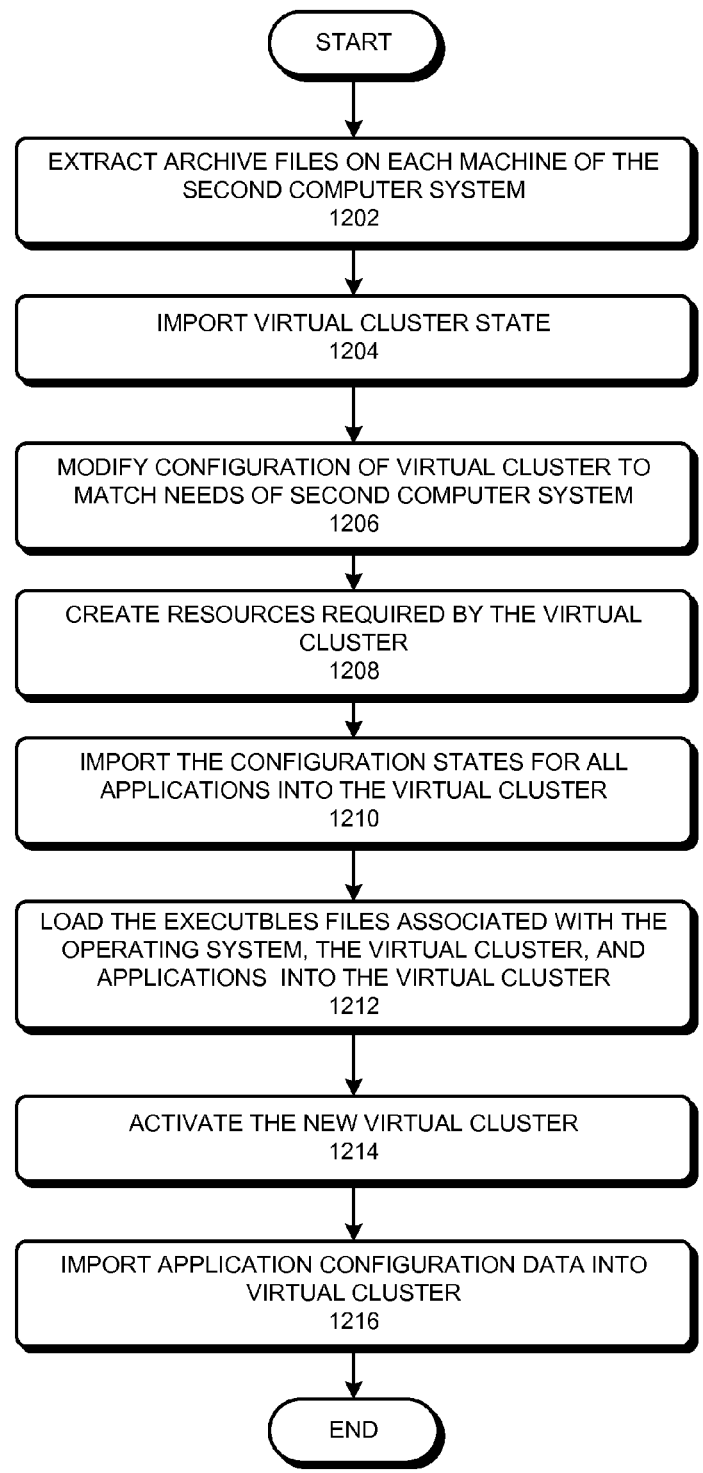
FIG. 12 presents a flowchart that illustrates a process for instantiating the captured virtual state of a virtual cluster in accordance with some embodiments.

FIG. 12 presents a flowchart that illustrates a process for instantiating the captured virtual state of a virtual cluster in accordance with some embodiments. Note that the specific arrangement of steps shown in the figure should not be construed as limiting the scope of the embodiments. We assume that a system administrator has logged in to a global zone on any node of the second computer system and has transferred the archive files to each machine of the second computer system.

The process can begin by extracting the archive files onto each machine of the second computer system (step 1202). The UNIX™ tar command may be used to extract the archive files.

Next, the system imports the virtual cluster state (step 1204) from the archive files. The virtual cluster state includes the virtual cluster configuration state, the application configuration state and the virtual nodes configuration state.

Next, the configuration of the virtual cluster may be modified to match the needs of the second computer system (step 1206). Since the machine names of the second computer system will usually differ from the machine names of the first computer system, which is serving as the source, the administrator may need to modify the machine names hosting the virtual cluster nodes on the second computer system. It is also possible that the second computer system may need different IP addresses, and so the administrator may need to adjust the IP addresses, too. At the end of the step, the new virtual cluster configuration has been established.

Next, resources required by the virtual cluster are created (1208) under the command of the administrator.

Next, the administrator imports the application configuration state for all applications that can be hosted in the virtual cluster (step 1210). In the Oracle Solaris Cluster, the administrator may execute the clzonecluster attach command to bring the virtual cluster into an installed state. This command may load the RGM resource type information, the resource group information, and the resource information, among other things.

Next, the binaries from the collection of executables files are extracted. These binaries associated with the operating system, the virtual cluster, and the applications are loaded into the virtual cluster (step 1212).

Next, the administrator activates the new virtual cluster (step 1214). Another term used is "booting" the virtual cluster.

Finally, the administrator imports the application data into the virtual cluster (step 1216).

Figure 13:
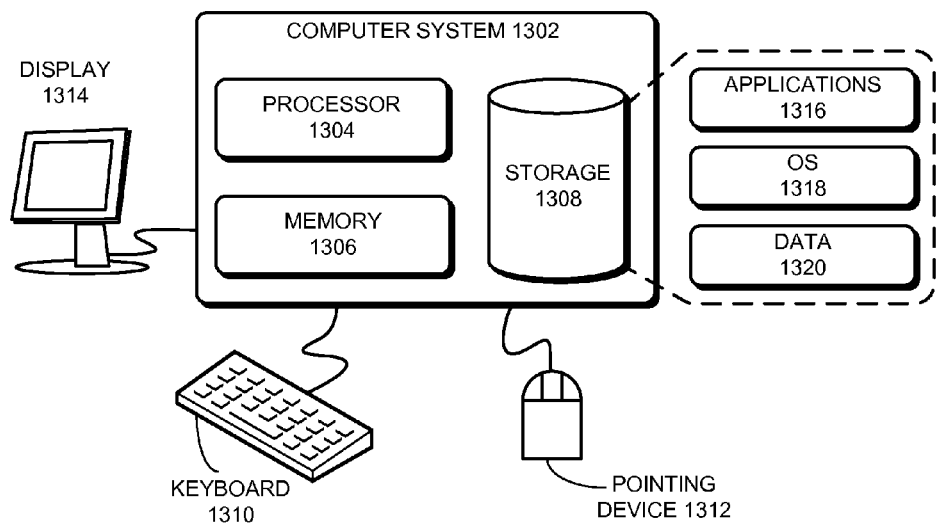
FIG. 13 illustrates a computer system in accordance with some embodiments.

FIG. 13 illustrates a computer system in accordance with some embodiments.

A computer or computer system can generally be any system that can perform computations. Specifically, a computer can be a microprocessor based system which may include multiple processing cores, a network processor based system, a digital signal processor based system, a portable computing device, a personal organizer, a distributed computing platform based system, or any other computing system now known or later developed.

Computer system 1302 comprises processor 1304, memory 1306, and storage 1308. Computer system 1302 can be coupled with display 1314, keyboard 1310, and pointing device 1312. Storage 1308 can generally be any device that can store data. Specifically, a storage device can be a magnetic, an optical, or a magneto-optical storage device, or it can be based on flash memory and/or battery-backed up memory. Storage 1308 can store applications 1316, operating system 1318, and data 1320. Applications 1316 can include instructions that when executed by computer 1302 cause computer 1302 to perform one or more processes described in this disclosure.

Figure 14:
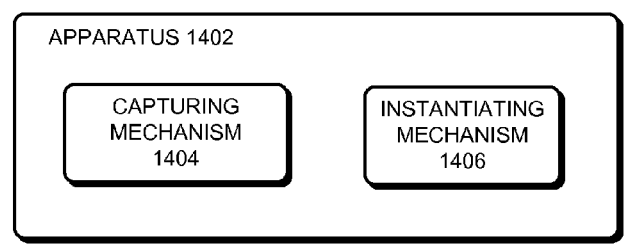
FIG. 14 illustrates an apparatus in accordance with some embodiments.

FIG. 14 illustrates an apparatus in accordance with some embodiments. Apparatus 1402 can comprise a number of mechanisms which may communicate with one another via a wired or wireless communication channel. Apparatus 1402 may be realized using one or more integrated circuits. Apparatus 1402 may be integrated with a computer system, or it may be realized as a separate device which is capable of communicating with other computer systems and/or devices. Specifically, apparatus 1402 can comprise capturing mechanism 1404 and instantiating mechanism 1406.

In some embodiments, capturing mechanism 1404 may be configured to capture the state of a virtual cluster on a first computer system where a virtual cluster includes one or more virtual nodes. Instantiating mechanism 1406 may be configured to instantiate the captured state of the virtual cluster on the second computer system.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes.

Note that the methods and processes can be embodied using a combination of code, data, and hardware modules or apparatuses. The foregoing descriptions of embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for migrating a state of a virtual cluster, comprising:
using at least one computer to capture the state of the virtual cluster on a first computer system, wherein the virtual cluster includes one or more virtual nodes, and wherein a given virtual node of the one or more virtual nodes represents a machine; and
instantiating the captured state of the virtual cluster on a second computer system,
wherein the captured state comprises an address for a network resource, names and paths of a file system and a failover file system for the virtual cluster, CPU and memory information for the virtual cluster, security privileges, and, for each of the one or more virtual nodes, a name for the virtual node and a mapping of the virtual node to a physical machine that the virtual node resides on.

2. The method of claim 1, wherein capturing the state of the virtual cluster on the first computer system further comprises:
extracting the state of the virtual cluster, wherein the state includes at least one of:
a configuration state of one or more applications; and
binaries associated with an operating system and the virtual cluster.

3. The method of claim 2, wherein the captured state of the virtual cluster includes at least one of:
one or more file systems;
one or more storage devices; and
one or more network resources.

4. The method of claim 2, wherein the captured state of the virtual cluster includes at least one of resources, resource types, and resource groups.

5. The method of claim 2, wherein the captured state of the virtual cluster includes at least one of software package information and patches installed in the virtual node of each machine.

6. The method of claim 1, wherein instantiating the captured state of the virtual cluster on the second computer system further comprises:
receiving the captured state of the virtual cluster on each machine of the second computer system;
creating resources required by the virtual cluster on each machine, wherein the resources include at least one or more file systems, one or more devices, or one or more IP addresses;
modifying configuration details of the virtual cluster on each machine of the second computer system; and
activating the virtual cluster on the second computer system.

7. The method of claim 1, wherein representing the machine involves the given virtual node:
managing a portion of the resources of the machine, wherein resources include at least one of processors, memory, or schedulers;
hosting applications that share the managed portion of the resources within the virtual node; and
isolating faults, wherein faults include at least one of application faults, user faults, or system faults.

8. The method of claim 7, wherein the given virtual node is constructed using operating system virtualization.

9. A non-transitory computer-readable storage medium storing instructions that when executed by a computer cause the computer to perform a method for migrating a state of a virtual cluster, the method comprising:
capturing the state of the virtual cluster on a first computer system, wherein the virtual cluster includes one or more virtual nodes, and wherein a given virtual node of the one or more virtual nodes represents a machine; and
instantiating the captured state of the virtual cluster on a second computer system, wherein the captured state comprises an address for a network resource, names and paths of a file system and a failover file system for the virtual cluster, CPU and memory information for the virtual cluster, security privileges, and, for each of the one or more virtual nodes, a name for the virtual node and a mapping of the virtual node to a physical machine that the virtual node resides on.

10. The non-transitory computer-readable storage medium of claim 9, wherein capturing the state of the virtual cluster on the first computer system further comprises:
   extracting the state of the virtual cluster, wherein the state includes at least one of:
     a configuration state of one or more applications; and
     binaries associated with an operating system and the virtual cluster.

11. The non-transitory computer-readable storage medium of claim 10, wherein the captured state of the virtual cluster includes at least one of:
   one or more file systems;
   one or more storage devices;
   one or more network resources;
   one or more operating system resources; and
   a set of operating system privileges.

12. The non-transitory computer-readable storage medium of claim 10, wherein the captured state of the virtual cluster includes at least one of resources, resource types, and resource groups.

13. The non-transitory computer-readable storage medium of claim 10, wherein the captured state of the virtual cluster includes at least one of a configuration of the virtual nodes, software package information, and patches installed in the virtual node of each machine.

14. The non-transitory computer-readable storage medium of claim 9, wherein instantiating the captured state of the virtual cluster on the second computer system further comprises:
   receiving the captured state of the virtual cluster on each machine of the second computer system;
   creating resources required by the virtual cluster on each machine, wherein the resources include one or more file systems, one or more devices, or one or more IP addresses;
   modifying configuration details of the virtual cluster on each machine of the second computer system; and
   activating the virtual cluster on the second computer system.

15. The non-transitory computer-readable storage medium of claim 9, wherein representing the machine involves the given virtual node:
   managing a portion of the resources of the machine, wherein resources include at least one of processors, memory, or schedulers;
   hosting applications that share the managed portion of the resources within the virtual node; and
   isolating faults, wherein faults include at least one of application faults, user faults, or system faults.

16. The non-transitory computer-readable storage medium of claim 15, wherein the given virtual node is constructed using operating system virtualization.

17. A computer system for migrating a state of a virtual cluster, comprising:
   a processor; and
   a memory;
   wherein the computer system is configured to,
     capture the state of the virtual cluster on a first computer system, wherein the virtual cluster includes one or more virtual nodes, and wherein a given virtual node of the one or more virtual nodes represents a machine; and
     instantiate the captured state of the virtual cluster on a second computer system,
   wherein the captured configuration state of the virtual cluster comprises an address for a network resource, names and paths of a file system and a failover file system for the virtual cluster, CPU and memory information for the virtual cluster, security privileges, and, for each of the one or more virtual nodes, a name for the virtual node and a mapping of the virtual node to a physical machine that the virtual node resides on.

18. The computer system of claim 17, wherein, while capturing the state of the virtual cluster on the first computer system, the computer system is configured to extract the state of the virtual cluster, and wherein the state includes at least one of:
   a configuration state of one or more applications;
   binaries associated with one or more applications;
   data associated with one or more applications; and
   binaries associated with the operating system and the virtual cluster.

19. The computer system of claim 17, wherein the captured state of the virtual cluster includes at least one of:
   one or more file systems;
   one or more storage devices;
   one or more network resources.

20. The computer system of claim 17, wherein the captured state of the virtual cluster includes at least one of resources, resource types, and resource groups.

* * * * *

UNITED STATES PATENT AND TRADEMARK OFFICE
CERTIFICATE OF CORRECTION

| | | |
|---|---|---|
| PATENT NO. | : 9,047,136 B2 | Page 1 of 1 |
| APPLICATION NO. | : 12/813744 | |
| DATED | : June 2, 2015 | |
| INVENTOR(S) | : Thanga et al. | |

It is certified that error appears in the above-identified patent and that said Letters Patent is hereby corrected as shown below:

In drawings,

On Drawing sheet 13 of 14, in figure 12, under reference numeral 1212, line 1, delete "EXECUTBLES" and insert -- EXECUTABLES --, therefor.

In specification,

Column 3, lines 36-37, delete "embodiments" and insert -- embodiments. --, therefor.

Column 6, line 53, delete "that that" and insert -- that --, therefor.

Signed and Sealed this
Ninth Day of February, 2016

Michelle K. Lee
*Director of the United States Patent and Trademark Office*